(12) United States Patent
Wright et al.

(10) Patent No.: US 11,622,032 B2
(45) Date of Patent: *Apr. 4, 2023

(54) SWITCH ASSEMBLY FOR ENGAGING A SWITCH OF AN ELECTRONIC DEVICE

(71) Applicant: CATALYST LIFESTYLE LIMITED, Hong Kong (CN)

(72) Inventors: Joshua Wright, Hong Kong (CN); June Lai, Hong Kong (CN)

(73) Assignee: Catalyst Lifestyle Limited, Hong Kong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/385,491

(22) Filed: Jul. 26, 2021

(65) Prior Publication Data
US 2021/0352167 A1 Nov. 11, 2021

Related U.S. Application Data

(63) Continuation of application No. 16/557,364, filed on Aug. 30, 2019, now Pat. No. 11,076,028.

(51) Int. Cl.
*H04M 1/02* (2006.01)
*A44B 19/26* (2006.01)
(Continued)

(52) U.S. Cl.
CPC ......... *H04M 1/0249* (2013.01); *A44B 19/265* (2013.01); *H01H 13/705* (2013.01);
(Continued)

(58) Field of Classification Search
CPC .... H04M 1/0249; H04M 1/185; H04M 1/026; H04M 1/236; A44B 19/265;
(Continued)

(56) References Cited

U.S. PATENT DOCUMENTS

| 1,195,299 A | 8/1916 | Wachter |
| 1,205,217 A | 11/1916 | Solomon |

(Continued)

FOREIGN PATENT DOCUMENTS

| AU | 2013101187 A4 | 10/2013 |
| CN | 201042019 Y | 3/2008 |

(Continued)

OTHER PUBLICATIONS

Extended European Search Report for European Application No. 19203848.7 dated Feb. 27, 2020, 9 pages.

(Continued)

*Primary Examiner* — Eugene Yun
(74) *Attorney, Agent, or Firm* — Dinsmore & Shohl LLP

(57) ABSTRACT

A switch assembly for engaging a switch of an electronic device includes a rotatable knob having an axis of rotation, a pin mechanism engaged with the rotatable knob, and a slider body. The pin mechanism includes a pin, the pin being offset from the axis of rotation of the rotatable knob. The slider body is shaped to include a slot in which the pin of the pin mechanism is positioned and a switch recess shaped to receive and selectively contact the switch of the electronic device. Rotation of the rotatable knob in a first direction causes the slider body toward contact with a first portion of the switch to urge the switch into a first position, and rotation of the rotatable knob in a second direction causes the slider body toward contact with a second portion of the switch to urge the switch into a second position.

20 Claims, 8 Drawing Sheets

(51) Int. Cl.
  *H01H 13/705* (2006.01)
  *H04B 1/3888* (2015.01)
  *H04M 1/18* (2006.01)
(52) U.S. Cl.
  CPC .......... *H04B 1/3888* (2013.01); *H04M 1/026* (2013.01); *H04M 1/185* (2013.01); *G06F 2200/1633* (2013.01)
(58) Field of Classification Search
  CPC .. H01H 13/705; H01H 3/10; H01H 2231/022; H01H 19/03; H01H 19/36; H01H 3/42; H01H 19/10; H01H 19/14; G06F 2200/1633; A45C 11/00; A45C 2011/002; A45C 2011/003
  See application file for complete search history.

(56) References Cited

U.S. PATENT DOCUMENTS

| | | |
|---|---|---|
| 1,986,328 A | 1/1935 | Dreyfus |
| 2,136,625 A | 11/1938 | Lasko |
| 2,392,787 A | 1/1946 | Henri |
| D157,606 S | 3/1950 | Lachman |
| 3,590,988 A | 7/1971 | Hollar |
| 3,737,605 A | 6/1973 | Tobey et al. |
| 3,746,206 A | 7/1973 | Utz |
| 3,789,601 A | 2/1974 | Bergey |
| 3,800,525 A | 4/1974 | Bergey |
| 3,992,874 A | 11/1976 | Collins |
| 4,236,239 A | 11/1980 | Imgruth et al. |
| 4,390,288 A | 6/1983 | Arnoux |
| D275,822 S | 10/1984 | Gatland et al. |
| D278,685 S | 5/1985 | Suzuki et al. |
| D279,081 S | 6/1985 | Suzuki et al. |
| D283,014 S | 3/1986 | Suzuki et al. |
| 4,584,718 A | 4/1986 | Fuller |
| D290,234 S | 6/1987 | Komatsu |
| 4,703,161 A | 10/1987 | McLean |
| D293,417 S | 12/1987 | Sakamaki |
| 4,733,776 A | 3/1988 | Ward |
| 4,736,418 A | 4/1988 | Steadman |
| 4,762,227 A | 8/1988 | Patterson |
| 4,836,256 A | 6/1989 | Meliconi |
| 5,025,921 A | 6/1991 | Gasparaitis et al. |
| 5,092,459 A | 3/1992 | Uljanic et al. |
| D327,646 S | 7/1992 | Hardigg et al. |
| D329,747 S | 9/1992 | Embree |
| D330,329 S | 10/1992 | Brightbill |
| 5,175,873 A | 12/1992 | Goldenberg et al. |
| D335,220 S | 5/1993 | Ward et al. |
| 5,211,471 A | 5/1993 | Rohrs |
| 5,239,968 A | 8/1993 | Rodriguez-Amaya et al. |
| D341,092 S | 11/1993 | Wild |
| 5,258,592 A | 11/1993 | Nishikawa et al. |
| D342,609 S | 12/1993 | Brightbill |
| 5,280,146 A | 1/1994 | Inagaki et al. |
| D347,324 S | 5/1994 | Dickinson |
| D347,732 S | 6/1994 | Wentz |
| D348,472 S | 7/1994 | Cyfko |
| D351,799 S | 10/1994 | Bulgari |
| D353,048 S | 12/1994 | VanSkiver et al. |
| 5,388,692 A | 2/1995 | Withrow et al. |
| 5,477,508 A | 12/1995 | Will |
| 5,491,311 A | 2/1996 | Muscat et al. |
| D381,512 S | 7/1997 | Green |
| 5,648,757 A | 7/1997 | Vernace et al. |
| D386,094 S | 11/1997 | Ventrella |
| D386,611 S | 11/1997 | Sheu |
| D402,105 S | 12/1998 | Erickson |
| 5,850,915 A | 12/1998 | Tajima |
| D409,374 S | 5/1999 | Laba et al. |
| D412,062 S | 7/1999 | Potter et al. |
| D413,202 S | 8/1999 | Schmitt et al. |
| D413,203 S | 8/1999 | Zurwelle et al. |
| D419,297 S | 1/2000 | Richardson et al. |
| D419,767 S | 2/2000 | Richardson et al. |
| D419,768 S | 2/2000 | Richardson et al. |
| 6,031,524 A | 2/2000 | Kunert |
| 6,041,924 A | 3/2000 | Tajima |
| 6,049,813 A | 4/2000 | Danielson et al. |
| D423,772 S | 5/2000 | Cooper et al. |
| 6,068,119 A | 5/2000 | Derr et al. |
| 6,094,785 A | 8/2000 | Montgomery et al. |
| D433,798 S | 11/2000 | Weinstock |
| D439,407 S | 3/2001 | Parker |
| 6,201,667 B1 | 3/2001 | Yamamoto et al. |
| 6,201,867 B1 | 3/2001 | Koike |
| 6,215,474 B1 | 4/2001 | Shah |
| 6,239,968 B1 | 5/2001 | Kim et al. |
| D443,133 S | 6/2001 | Richardson et al. |
| 6,273,252 B1 | 8/2001 | Mitchell |
| 6,301,100 B1 | 10/2001 | Iwata |
| 6,313,892 B2 | 11/2001 | Gleckman |
| 6,313,982 B1 | 11/2001 | Hino |
| 6,317,313 B1 | 11/2001 | Mosgrove et al. |
| 6,349,824 B1 | 2/2002 | Yamada |
| 6,388,877 B1 | 5/2002 | Canova et al. |
| 6,415,138 B2 | 7/2002 | Sirola et al. |
| 6,445,577 B1 | 9/2002 | Madsen et al. |
| 6,456,487 B1 | 9/2002 | Hetterick |
| 6,468,619 B1 | 10/2002 | Larroche |
| 6,471,056 B1 | 10/2002 | Tzeng |
| D465,163 S | 11/2002 | Bodino |
| D465,330 S | 11/2002 | Parker |
| D470,659 S | 2/2003 | Story et al. |
| 6,519,141 B2 | 2/2003 | Tseng et al. |
| 6,536,589 B2 | 3/2003 | Chang |
| D472,384 S | 4/2003 | Richardson |
| 6,568,619 B1 | 5/2003 | Shiga et al. |
| 6,617,973 B1 | 9/2003 | Osterman |
| 6,646,864 B2 | 11/2003 | Richardson |
| 6,659,274 B2 | 12/2003 | Enners |
| 6,665,174 B1 | 12/2003 | Derr et al. |
| D484,874 S | 1/2004 | Chang et al. |
| 6,701,159 B1 | 3/2004 | Powell |
| D507,975 S | 8/2005 | Dreyfuss |
| D513,123 S | 12/2005 | Richardson et al. |
| 6,980,777 B2 | 12/2005 | Shepherd et al. |
| D513,451 S | 1/2006 | Richardson et al. |
| D514,808 S | 2/2006 | Morine et al. |
| D515,588 S | 2/2006 | Kirkwood |
| 6,995,976 B2 | 2/2006 | Richardson |
| D516,309 S | 3/2006 | Richardson et al. |
| D516,553 S | 3/2006 | Richardson et al. |
| D516,554 S | 3/2006 | Richardson et al. |
| D516,807 S | 3/2006 | Richardson et al. |
| D517,430 S | 3/2006 | TerMeer et al. |
| 7,054,441 B2 | 5/2006 | Pletikosa |
| 7,069,063 B2 | 6/2006 | Halkosaari et al. |
| D526,780 S | 8/2006 | Richardson et al. |
| D528,440 S | 9/2006 | Lovegrove |
| D528,441 S | 9/2006 | Burton |
| D528,928 S | 9/2006 | Burton |
| D530,079 S | 10/2006 | Thomas et al. |
| 7,158,376 B2 | 1/2007 | Richardson et al. |
| 7,180,735 B2 | 2/2007 | Thomas et al. |
| 7,194,291 B2 | 3/2007 | Peng |
| D539,671 S | 4/2007 | Lassigne |
| D542,524 S | 5/2007 | Richardson et al. |
| 7,230,823 B2 | 6/2007 | Richardson et al. |
| 7,290,654 B2 | 11/2007 | Hodges |
| D557,264 S | 12/2007 | Richardson et al. |
| D557,897 S | 12/2007 | Richardson et al. |
| 7,312,984 B2 | 12/2007 | Richardson et al. |
| D564,367 S | 3/2008 | Molyneux |
| D581,155 S | 11/2008 | Richardson et al. |
| D581,421 S | 11/2008 | Richardson et al. |
| 7,449,650 B2 | 11/2008 | Richardson et al. |
| D587,008 S | 2/2009 | Richardson et al. |
| 7,495,895 B2 | 2/2009 | Carnevali |
| D589,016 S | 3/2009 | Richardson et al. |
| D593,319 S | 6/2009 | Richardson et al. |
| D593,746 S | 6/2009 | Richardson et al. |

(56) References Cited

U.S. PATENT DOCUMENTS

| | | |
|---|---|---|
| D597,089 S | 7/2009 | Khan et al. |
| D597,301 S | 8/2009 | Richardson et al. |
| 7,609,512 B2 | 10/2009 | Richardson et al. |
| D603,602 S | 11/2009 | Richardson et al. |
| D603,827 S | 11/2009 | Tompkin et al. |
| D605,850 S | 12/2009 | Richardson et al. |
| 7,647,082 B2 | 1/2010 | Holmberg |
| 7,663,879 B2 | 2/2010 | Richardson et al. |
| 7,688,580 B2 | 3/2010 | Richardson et al. |
| D613,282 S | 4/2010 | Richardson et al. |
| 7,705,255 B2 | 4/2010 | Yokote |
| D616,430 S | 5/2010 | Fathollahi |
| D616,879 S | 6/2010 | Kim et al. |
| D622,716 S | 8/2010 | Andre et al. |
| D623,180 S | 9/2010 | Diebel |
| D624,064 S | 9/2010 | Esposito |
| D625,303 S | 10/2010 | Kim |
| D627,778 S | 11/2010 | Akana et al. |
| 7,889,489 B2 | 2/2011 | Richardson et al. |
| 7,907,394 B2 | 3/2011 | Richardson et al. |
| 7,933,122 B2 | 4/2011 | Richardson et al. |
| D638,312 S | 5/2011 | Jacobs |
| D638,324 S | 5/2011 | Tang |
| 7,941,196 B2 | 5/2011 | Kawasaki et al. |
| 7,946,758 B2 | 5/2011 | Mooring |
| D643,029 S | 8/2011 | Feng |
| D645,031 S | 9/2011 | Richardson et al. |
| 8,045,323 B2 | 10/2011 | Murakata |
| D654,069 S | 2/2012 | Kwon et al. |
| 8,143,982 B1 | 3/2012 | Lauder et al. |
| 8,143,983 B1 | 3/2012 | Lauder et al. |
| D657,262 S | 4/2012 | Pulli |
| D657,354 S | 4/2012 | Kim |
| 8,164,899 B2 | 4/2012 | Yamaguchi et al. |
| D659,691 S | 5/2012 | Kim et al. |
| 8,208,980 B2 | 6/2012 | Wong et al. |
| D662,922 S | 7/2012 | Akana et al. |
| D662,923 S | 7/2012 | Piedra et al. |
| D663,263 S | 7/2012 | Gupta et al. |
| 8,253,518 B2 | 8/2012 | Lauder et al. |
| D666,924 S | 9/2012 | Ahlstrom |
| 8,264,310 B2 | 9/2012 | Lauder et al. |
| 8,269,104 B2 | 9/2012 | Choraku et al. |
| D668,660 S | 10/2012 | Norfolk |
| D668,661 S | 10/2012 | Norfolk |
| D669,062 S | 10/2012 | Rothbaum et al. |
| 8,289,115 B2 | 10/2012 | Cretella, Jr. et al. |
| D670,280 S | 11/2012 | Rayner |
| D670,281 S | 11/2012 | Corpuz et al. |
| D670,702 S | 11/2012 | Zhang et al. |
| D671,107 S | 11/2012 | Rothbaum et al. |
| D671,932 S | 12/2012 | Azoulay |
| D671,933 S | 12/2012 | Rodgers |
| D672,255 S | 12/2012 | Zanella et al. |
| D672,265 S | 12/2012 | Pulli |
| 8,328,008 B2 | 12/2012 | Diebel et al. |
| D673,477 S | 1/2013 | Szellos |
| D675,210 S | 1/2013 | Kim |
| 8,342,325 B2 | 1/2013 | Rayner |
| 8,344,836 B2 | 1/2013 | Lauder et al. |
| 8,345,412 B2 | 1/2013 | Maravilla et al. |
| D675,606 S | 2/2013 | Adelman et al. |
| D676,432 S | 2/2013 | Hasbrook et al. |
| 8,382,059 B2 | 2/2013 | Le Gette et al. |
| D677,249 S | 3/2013 | Li et al. |
| D677,250 S | 3/2013 | Takamoto |
| D677,251 S | 3/2013 | Melanson et al. |
| D678,871 S | 3/2013 | Mishan et al. |
| 8,390,411 B2 | 3/2013 | Lauder et al. |
| 8,390,412 B2 | 3/2013 | Lauder et al. |
| 8,393,464 B2 | 3/2013 | Yang et al. |
| 8,395,465 B2 | 3/2013 | Lauder et al. |
| D679,685 S | 4/2013 | Cox |
| D679,714 S | 4/2013 | Smith et al. |
| D680,120 S | 4/2013 | Cho et al. |
| 8,433,377 B1 | 4/2013 | Oh et al. |
| D683,136 S | 5/2013 | Wilson et al. |
| D683,338 S | 5/2013 | Wilson et al. |
| 8,442,602 B2 | 5/2013 | Wong et al. |
| 8,453,835 B2 | 6/2013 | So |
| 8,457,701 B2 | 6/2013 | Diebel |
| D685,779 S | 7/2013 | Schriefer et al. |
| D687,026 S | 7/2013 | Ruvolo |
| D687,426 S | 8/2013 | Requa |
| D688,582 S | 8/2013 | Wilson |
| D688,655 S | 8/2013 | Rey-Hipolito et al. |
| 8,504,126 B1 | 8/2013 | Maravilla et al. |
| D688,967 S | 9/2013 | Wilson |
| D689,852 S | 9/2013 | Azoulay |
| D690,292 S | 9/2013 | Bibla et al. |
| D691,124 S | 10/2013 | Yang |
| D691,990 S | 10/2013 | Rayner |
| D692,419 S | 10/2013 | Rayner |
| 8,544,639 B2 | 10/2013 | Yang et al. |
| 8,548,536 B1 | 10/2013 | Gunnip |
| D693,251 S | 11/2013 | Anderssen et al. |
| D693,801 S | 11/2013 | Rayner |
| D694,227 S | 11/2013 | Rayner |
| D694,244 S | 11/2013 | Magness et al. |
| 8,576,031 B2 | 11/2013 | Lauder et al. |
| D694,759 S | 12/2013 | Chang et al. |
| D695,731 S | 12/2013 | Adami |
| D696,234 S | 12/2013 | Wright |
| 8,616,422 B2 | 12/2013 | Adelman et al. |
| D697,504 S | 1/2014 | Yang |
| 8,624,695 B2 | 1/2014 | Cretella, Jr. et al. |
| D698,772 S | 2/2014 | Merenda |
| D700,598 S | 3/2014 | Kim |
| 8,671,553 B1 | 3/2014 | Raisch |
| 8,675,862 B1 | 3/2014 | Lin |
| 8,676,280 B2 | 3/2014 | Kong |
| 8,676,281 B1 | 3/2014 | Caulder et al. |
| D703,211 S | 4/2014 | Weller et al. |
| D703,652 S | 4/2014 | Melanson et al. |
| D703,656 S | 4/2014 | Witter et al. |
| D704,182 S | 5/2014 | Smith |
| D704,688 S | 5/2014 | Reivo et al. |
| D705,763 S | 5/2014 | Fastman et al. |
| 8,714,510 B2 | 5/2014 | McCosh et al. |
| 8,718,731 B1 | 5/2014 | Tang |
| D706,253 S | 6/2014 | Simmer |
| D706,272 S | 6/2014 | Poon |
| D707,216 S | 6/2014 | Lee |
| 8,759,675 B2 | 6/2014 | Rajeswaran et al. |
| 8,761,388 B2 | 6/2014 | Chen et al. |
| D709,057 S | 7/2014 | Wilson et al. |
| D709,059 S | 7/2014 | Kim et al. |
| D709,060 S | 7/2014 | Melanson et al. |
| D709,486 S | 7/2014 | Lin |
| D709,869 S | 7/2014 | Witter et al. |
| 8,763,802 B2 | 7/2014 | Ellis-Brown |
| 8,770,402 B2 | 7/2014 | Bergreen et al. |
| 8,774,446 B2 | 7/2014 | Merenda |
| 8,774,881 B2 | 7/2014 | Johnson |
| 8,777,003 B2 | 7/2014 | Hong et al. |
| 8,780,535 B2 | 7/2014 | Mongan et al. |
| 8,787,009 B2 | 7/2014 | Wilson et al. |
| D712,890 S | 9/2014 | McCormac et al. |
| D712,893 S | 9/2014 | Lee |
| D712,895 S | 9/2014 | Lee et al. |
| D713,833 S | 9/2014 | Wilkey |
| D713,834 S | 9/2014 | Almstrom |
| D714,278 S | 9/2014 | Case et al. |
| 8,825,124 B1 | 9/2014 | Davies et al. |
| D714,769 S | 10/2014 | Rayner |
| D714,770 S | 10/2014 | Nolan et al. |
| D714,771 S | 10/2014 | Rayner |
| D715,786 S | 10/2014 | Lee et al. |
| D715,787 S | 10/2014 | Lee et al. |
| D715,788 S | 10/2014 | Lee et al. |
| D716,283 S | 10/2014 | Lee et al. |
| D716,784 S | 11/2014 | Wen |
| D716,786 S | 11/2014 | Wilson et al. |
| D717,678 S | 11/2014 | Anderssen et al. |

(56) References Cited

U.S. PATENT DOCUMENTS

| | | |
|---|---|---|
| D717,781 S | 11/2014 | Kim |
| D718,291 S | 11/2014 | Hong |
| D718,316 S | 11/2014 | Veltz et al. |
| 8,879,773 B2 | 11/2014 | Merenda |
| D718,756 S | 12/2014 | Barfoot et al. |
| D718,759 S | 12/2014 | Barfoot et al. |
| D719,143 S | 12/2014 | Vidovic |
| D719,145 S | 12/2014 | Barfoot et al. |
| D719,949 S | 12/2014 | Tussy |
| 8,899,415 B2 | 12/2014 | McCosh et al. |
| D720,739 S | 1/2015 | Liu |
| D721,356 S | 1/2015 | Hasbrook et al. |
| D721,360 S | 1/2015 | Laffon de Mazieres et al. |
| D721,685 S | 1/2015 | Hasbrook et al. |
| D723,016 S | 2/2015 | Lee et al. |
| D723,019 S | 2/2015 | Chan et al. |
| 8,960,421 B1 | 2/2015 | Diebel |
| 8,960,634 B2 | 2/2015 | Le Gette et al. |
| D723,531 S | 3/2015 | Katzke |
| D724,066 S | 3/2015 | Fathollahi |
| D724,094 S | 3/2015 | Blochinger et al. |
| D725,091 S | 3/2015 | Wen |
| D725,117 S | 3/2015 | Melanson et al. |
| 8,967,437 B2 | 3/2015 | Wilson |
| 8,983,559 B2 | 3/2015 | Chiu |
| 8,989,826 B1 | 3/2015 | Connolly |
| D726,172 S | 4/2015 | Watkins et al. |
| D726,173 S | 4/2015 | Kim et al. |
| D726,174 S | 4/2015 | Wahlin |
| D727,194 S | 4/2015 | Wilson |
| D727,883 S | 4/2015 | Brand et al. |
| 9,007,758 B2 | 4/2015 | Wilson et al. |
| 9,008,725 B2 | 4/2015 | Schmidt |
| 9,008,738 B1 | 4/2015 | Dong |
| D729,218 S | 5/2015 | Wilson et al. |
| D729,785 S | 5/2015 | Magness et al. |
| D729,786 S | 5/2015 | Lee et al. |
| D730,338 S | 5/2015 | Lee et al. |
| D730,339 S | 5/2015 | Lee et al. |
| D730,341 S | 5/2015 | Chan et al. |
| 9,025,948 B2 | 5/2015 | Tages et al. |
| 9,031,623 B2 | 5/2015 | Yoo |
| D731,472 S | 6/2015 | Lee et al. |
| D731,493 S | 6/2015 | Mills |
| D731,494 S | 6/2015 | Barfoot et al. |
| D732,042 S | 6/2015 | Chen et al. |
| 9,056,696 B1 | 6/2015 | Reyes |
| D733,696 S | 7/2015 | Burgett et al. |
| D735,182 S | 7/2015 | Watkins et al. |
| D735,184 S | 7/2015 | Lee et al. |
| D735,207 S | 7/2015 | Dahlberg |
| 9,077,013 B2 | 7/2015 | Huang et al. |
| D736,777 S | 8/2015 | Rayner |
| D737,159 S | 8/2015 | Akana et al. |
| D737,263 S | 8/2015 | Armstrong et al. |
| 9,101,184 B2 | 8/2015 | Wilson |
| 9,107,484 B2 | 8/2015 | Chaney |
| D739,768 S | 9/2015 | Hanshew et al. |
| 9,123,935 B2 | 9/2015 | Huang |
| D740,798 S | 10/2015 | Poon et al. |
| D741,726 S | 10/2015 | Akana et al. |
| D742,254 S | 11/2015 | Greusel et al. |
| D742,761 S | 11/2015 | Grazian et al. |
| D742,868 S | 11/2015 | Odhwani et al. |
| D742,869 S | 11/2015 | Odhwani et al. |
| D743,388 S | 11/2015 | Fitzpatrick et al. |
| D743,389 S | 11/2015 | Akana et al. |
| D744,356 S | 12/2015 | Akana et al. |
| D745,421 S | 12/2015 | Akana et al. |
| D745,505 S | 12/2015 | Barfoot et al. |
| D745,506 S | 12/2015 | Barfoot et al. |
| D746,275 S | 12/2015 | Mohammad |
| 9,223,346 B2 | 12/2015 | Wilson |
| 9,225,377 B1 | 12/2015 | Hart |
| D746,707 S | 1/2016 | Akana et al. |
| D748,083 S | 1/2016 | Peterson, III |
| D748,085 S | 1/2016 | Merenda |
| D748,612 S | 2/2016 | Chan et al. |
| D748,613 S | 2/2016 | Sasaki et al. |
| D748,614 S | 2/2016 | Ju |
| 9,259,076 B2 | 2/2016 | Gayler |
| 9,264,088 B2 | 2/2016 | Wojcik et al. |
| 9,264,089 B2 | 2/2016 | Tages |
| 9,267,638 B2 | 2/2016 | Le Gette et al. |
| D750,610 S | 3/2016 | Chen |
| D751,067 S | 3/2016 | Nousiainen |
| D751,550 S | 3/2016 | Solomon et al. |
| D751,558 S | 3/2016 | Lee |
| D752,044 S | 3/2016 | Akana et al. |
| D752,579 S | 3/2016 | Lee |
| 9,301,414 B2 | 3/2016 | Chao |
| D752,996 S | 4/2016 | Ebersold |
| D753,124 S | 4/2016 | Corcoran et al. |
| D753,641 S | 4/2016 | Roberts et al. |
| D754,132 S | 4/2016 | Dahlberg |
| D754,133 S | 4/2016 | Chen et al. |
| D754,651 S | 4/2016 | Roberts et al. |
| D754,652 S | 4/2016 | Roberts et al. |
| D754,666 S | 4/2016 | Tiffen et al. |
| 9,316,344 B2 | 4/2016 | Le Gette et al. |
| D755,171 S | 5/2016 | Bae et al. |
| D755,172 S | 5/2016 | Lee et al. |
| D755,187 S | 5/2016 | Shannon, III |
| D756,340 S | 5/2016 | Babichenko |
| D756,343 S | 5/2016 | Wall et al. |
| D756,344 S | 5/2016 | Roberts et al. |
| D756,345 S | 5/2016 | Roberts et al. |
| D756,357 S | 5/2016 | Akana et al. |
| D757,017 S | 5/2016 | Sirichai |
| D757,018 S | 5/2016 | Pearce |
| D757,702 S | 5/2016 | Kanazawa |
| D757,703 S | 5/2016 | Kanazawa |
| D757,704 S | 5/2016 | Roberts et al. |
| D759,641 S | 6/2016 | Lai et al. |
| D759,644 S | 6/2016 | Penn |
| D759,645 S | 6/2016 | Penn |
| D759,658 S | 6/2016 | Lai et al. |
| D759,725 S | 6/2016 | Akana et al. |
| D761,241 S | 7/2016 | Nguyen et al. |
| D761,263 S | 7/2016 | Brinkman et al. |
| D761,780 S | 7/2016 | Nguyen et al. |
| D762,202 S | 7/2016 | Tseng et al. |
| D762,218 S | 7/2016 | Sirichai |
| D762,219 S | 7/2016 | Armstrong et al. |
| D762,651 S | 8/2016 | Edwards et al. |
| D763,239 S | 8/2016 | Chan et al. |
| D763,264 S | 8/2016 | Smith et al. |
| D763,853 S | 8/2016 | Pearce |
| D763,854 S | 8/2016 | Domke et al. |
| D763,855 S | 8/2016 | Poon et al. |
| D763,856 S | 8/2016 | Moore |
| D764,449 S | 8/2016 | Chan et al. |
| D764,472 S | 8/2016 | Corcoran et al. |
| D764,474 S | 8/2016 | Penn |
| D764,475 S | 8/2016 | Penn |
| D765,086 S | 8/2016 | Lee et al. |
| D765,627 S | 9/2016 | Watt |
| D765,629 S | 9/2016 | Watt et al. |
| D765,638 S | 9/2016 | Gaylord et al. |
| D765,645 S | 9/2016 | Kim |
| D766,248 S | 9/2016 | Holladay et al. |
| D766,249 S | 9/2016 | Veltz et al. |
| 9,444,506 B2 | 9/2016 | Lai et al. |
| D768,122 S | 10/2016 | Buffone |
| D768,612 S | 10/2016 | Wright et al. |
| D768,617 S | 10/2016 | Merenda |
| D769,880 S | 10/2016 | Moore et al. |
| D770,458 S | 11/2016 | Corcoran et al. |
| D771,027 S | 11/2016 | Prstojevich et al. |
| D772,208 S | 11/2016 | Merenda |
| D772,210 S | 11/2016 | Igarashi |
| D772,854 S | 11/2016 | Igarashi |
| D772,855 S | 11/2016 | Ju |
| D772,858 S | 11/2016 | Hu |

(56) References Cited

U.S. PATENT DOCUMENTS

| | | |
|---|---|---|
| D772,881 S | 11/2016 | Chang et al. |
| D773,448 S | 12/2016 | Armillotti |
| D773,470 S | 12/2016 | Akana et al. |
| D775,113 S | 12/2016 | Lim et al. |
| D775,114 S | 12/2016 | Khalili |
| D775,132 S | 12/2016 | Smith et al. |
| D775,617 S | 1/2017 | Samson |
| D775,628 S | 1/2017 | Brown et al. |
| D776,100 S | 1/2017 | Igarashi |
| D776,102 S | 1/2017 | Kim |
| D776,120 S | 1/2017 | Brown et al. |
| D776,122 S | 1/2017 | Akana et al. |
| D776,123 S | 1/2017 | Akana et al. |
| D777,715 S | 1/2017 | Sawaya |
| D777,719 S | 1/2017 | Kim |
| D777,727 S | 1/2017 | Maicon et al. |
| 9,538,675 B2 | 1/2017 | Le Gette et al. |
| D778,273 S | 2/2017 | Kim |
| D778,274 S | 2/2017 | Lim et al. |
| D778,275 S | 2/2017 | Gabriel et al. |
| D779,473 S | 2/2017 | Lee |
| 9,568,954 B2 | 2/2017 | Lauder et al. |
| D780,738 S | 3/2017 | Barfoot et al. |
| D781,277 S | 3/2017 | Cameron |
| D781,278 S | 3/2017 | Kim et al. |
| D781,833 S | 3/2017 | Daniels et al. |
| D781,834 S | 3/2017 | Kim et al. |
| D781,835 S | 3/2017 | Kim et al. |
| D781,836 S | 3/2017 | Kim et al. |
| D781,837 S | 3/2017 | Kim et al. |
| D781,838 S | 3/2017 | Kim et al. |
| D781,839 S | 3/2017 | Kim et al. |
| D781,840 S | 3/2017 | Kim et al. |
| D781,863 S | 3/2017 | Lai et al. |
| D784,316 S | 4/2017 | Lim et al. |
| D784,348 S | 4/2017 | Zhang |
| D784,350 S | 4/2017 | Li |
| D784,976 S | 4/2017 | Cebe |
| D784,995 S | 4/2017 | Akana et al. |
| D785,636 S | 5/2017 | Oberpriller et al. |
| D785,637 S | 5/2017 | Hennings et al. |
| D786,230 S | 5/2017 | Yang |
| D786,256 S | 5/2017 | Stewart |
| D786,257 S | 5/2017 | Feldman |
| D786,853 S | 5/2017 | Friedland et al. |
| D786,881 S | 5/2017 | Stewart et al. |
| D787,497 S | 5/2017 | Friedland et al. |
| 9,661,906 B2 | 5/2017 | Diebel et al. |
| D788,758 S | 6/2017 | Liu |
| D789,341 S | 6/2017 | Brown et al. |
| D789,343 S | 6/2017 | Hawes et al. |
| D789,347 S | 6/2017 | Zamudio |
| D789,936 S | 6/2017 | Nyholm |
| D789,937 S | 6/2017 | Zhang |
| D790,526 S | 6/2017 | Babichenko |
| D790,550 S | 6/2017 | Chen |
| 9,680,518 B2 | 6/2017 | Wojcik et al. |
| D791,113 S | 7/2017 | Tien et al. |
| D794,036 S | 8/2017 | Hennings et al. |
| D795,237 S | 8/2017 | Jung et al. |
| D795,264 S | 8/2017 | Wright et al. |
| D795,881 S | 8/2017 | Akana et al. |
| D798,287 S | 9/2017 | Wright et al. |
| D798,855 S | 10/2017 | Wright et al. |
| D800,133 S | 10/2017 | Wright et al. |
| D800,712 S | 10/2017 | Lai et al. |
| D812,618 S | 3/2018 | Altaras |
| D816,074 S | 4/2018 | Deng |
| D819,622 S | 6/2018 | Wright et al. |
| D819,644 S | 6/2018 | Wright et al. |
| D820,822 S | 6/2018 | Wright et al. |
| D821,383 S | 6/2018 | Deng |
| 9,997,751 B2 | 6/2018 | Fathollahi et al. |
| D828,350 S | 9/2018 | Akana et al. |
| D832,245 S | 10/2018 | Jeon |
| D833,425 S | 11/2018 | Ahn |
| D836,100 S | 12/2018 | Akana et al. |
| D839,863 S | 2/2019 | Ahn |
| D842,292 S | 3/2019 | Ahn |
| D851,078 S | 6/2019 | Yuan |
| D852,184 S | 6/2019 | Hyun |
| 10,328,295 B2 | 6/2019 | Cordani |
| D855,601 S | 8/2019 | Dang et al. |
| 10,383,416 B2 | 8/2019 | Hynecek et al. |
| 10,694,825 B2 | 6/2020 | Hynecek et al. |
| 11,076,028 B2 * | 7/2021 | Wright ............... H04M 1/0249 |
| 2003/0063004 A1 | 4/2003 | Anthony et al. |
| 2003/0111366 A1 | 6/2003 | Enners |
| 2004/0173402 A1 | 9/2004 | Morkerken |
| 2004/0178202 A1 | 9/2004 | Serio, Jr. |
| 2005/0067216 A1 | 3/2005 | Schuhmann et al. |
| 2006/0279924 A1 | 12/2006 | Richardson et al. |
| 2007/0087640 A1 | 4/2007 | Albertone et al. |
| 2007/0115387 A1 | 5/2007 | Ho |
| 2007/0139873 A1 | 6/2007 | Thomas et al. |
| 2007/0297149 A1 | 12/2007 | Richardson et al. |
| 2008/0068934 A1 | 3/2008 | Hiranuma et al. |
| 2008/0094786 A1 | 4/2008 | Liou et al. |
| 2008/0192114 A1 | 8/2008 | Pearson et al. |
| 2008/0298026 A1 | 12/2008 | Wang et al. |
| 2009/0009945 A1 | 1/2009 | Johnson et al. |
| 2009/0080153 A1 | 3/2009 | Richardson et al. |
| 2009/0194400 A1 | 8/2009 | Mackay |
| 2009/0215412 A1 | 8/2009 | Liu et al. |
| 2009/0236207 A1 | 9/2009 | Shi et al. |
| 2010/0008028 A1 | 1/2010 | Richardson et al. |
| 2010/0104814 A1 | 4/2010 | Richardson et al. |
| 2010/0113111 A1 | 5/2010 | Wong et al. |
| 2010/0147737 A1 | 6/2010 | Richardson et al. |
| 2010/0200456 A1 | 8/2010 | Parkinson |
| 2010/0298025 A1 | 11/2010 | Spence |
| 2010/0311475 A1 | 12/2010 | Takatsuka et al. |
| 2011/0003213 A1 | 1/2011 | Burchardt et al. |
| 2011/0024315 A1 | 2/2011 | Kim |
| 2011/0073505 A1 | 3/2011 | Stiehl |
| 2011/0073608 A1 | 3/2011 | Richardson et al. |
| 2011/0139643 A1 | 6/2011 | Elenes |
| 2011/0143114 A1 | 6/2011 | Horie et al. |
| 2011/0182463 A1 | 7/2011 | Lee |
| 2011/0226545 A1 | 9/2011 | Richardson et al. |
| 2011/0228458 A1 | 9/2011 | Richardson et al. |
| 2011/0228459 A1 | 9/2011 | Richardson et al. |
| 2012/0018323 A1 | 1/2012 | Johnson et al. |
| 2012/0018325 A1 | 1/2012 | Kim |
| 2012/0021810 A1 | 1/2012 | Terry |
| 2012/0031914 A1 | 2/2012 | Liu |
| 2012/0038117 A1 | 2/2012 | Knapp |
| 2012/0043235 A1 | 2/2012 | Klement |
| 2012/0073093 A1 | 3/2012 | Szellos |
| 2012/0074005 A1 | 3/2012 | Johnson et al. |
| 2012/0075809 A1 | 3/2012 | Chen |
| 2012/0077548 A1 | 3/2012 | Goldberg |
| 2012/0088558 A1 | 4/2012 | Song |
| 2012/0099266 A1 | 4/2012 | Reber et al. |
| 2012/0118773 A1 | 5/2012 | Rayner |
| 2012/0154119 A1 | 6/2012 | Schepps |
| 2012/0211382 A1 | 8/2012 | Rayner |
| 2012/0227251 A1 | 9/2012 | Hyuga et al. |
| 2012/0261306 A1 | 10/2012 | Richardson et al. |
| 2012/0284124 A1 | 11/2012 | Harangozo et al. |
| 2012/0309472 A1 | 12/2012 | Wong et al. |
| 2012/0309475 A1 | 12/2012 | Johnson |
| 2012/0315972 A1 | 12/2012 | Olson et al. |
| 2012/0325723 A1 | 12/2012 | Carnevali |
| 2012/0329535 A1 | 12/2012 | Kuo |
| 2013/0001263 A1 | 1/2013 | Kai |
| 2013/0063004 A1 | 3/2013 | Lai et al. |
| 2013/0079067 A1 | 3/2013 | Peng |
| 2013/0146491 A1 | 6/2013 | Ghali et al. |
| 2013/0157730 A1 | 6/2013 | McCormac et al. |
| 2013/0175186 A1 | 7/2013 | Simmer |
| 2013/0203470 A1 | 8/2013 | Schneider et al. |
| 2013/0210502 A1 | 8/2013 | Maravilla et al. |
| 2013/0242481 A1 | 9/2013 | Kim et al. |

(56) References Cited

U.S. PATENT DOCUMENTS

| | | |
|---|---|---|
| 2013/0255198 A1 | 10/2013 | Guschke et al. |
| 2013/0264143 A1 | 10/2013 | Richardson et al. |
| 2013/0271902 A1 | 10/2013 | Lai et al. |
| 2013/0294020 A1 | 11/2013 | Rayner et al. |
| 2013/0319836 A1 | 12/2013 | Chen et al. |
| 2013/0344925 A1 | 12/2013 | Lu et al. |
| 2014/0016217 A1 | 1/2014 | Rayner |
| 2014/0048574 A1 | 2/2014 | Kimble |
| 2014/0066142 A1 | 3/2014 | Gipson |
| 2014/0066143 A1 | 3/2014 | Choi |
| 2014/0066144 A1 | 3/2014 | Hong |
| 2014/0069786 A1 | 3/2014 | Werner et al. |
| 2014/0113691 A1 | 4/2014 | Oh et al. |
| 2014/0117061 A1 | 5/2014 | Hadi |
| 2014/0128130 A1 | 5/2014 | Chiu |
| 2014/0152890 A1 | 6/2014 | Rayner |
| 2014/0187295 A1 | 7/2014 | Kumar et al. |
| 2014/0191034 A1 | 7/2014 | Glanzer et al. |
| 2014/0194168 A1 | 7/2014 | Lehmann |
| 2014/0200054 A1 | 7/2014 | Fraden |
| 2014/0228082 A1 | 8/2014 | Morrow et al. |
| 2014/0235963 A1 | 8/2014 | Edwards et al. |
| 2014/0262712 A1 | 9/2014 | Chu |
| 2014/0274232 A1 | 9/2014 | Tages |
| 2014/0339104 A1 | 11/2014 | Magness |
| 2014/0356495 A1 | 12/2014 | Teuscher |
| 2014/0357328 A1 | 12/2014 | Aharon et al. |
| 2014/0357330 A1 | 12/2014 | Lin |
| 2014/0364176 A1 | 12/2014 | Pintor |
| 2014/0370946 A1 | 12/2014 | Daniell et al. |
| 2015/0001104 A1 | 1/2015 | Kim |
| 2015/0045096 A1 | 2/2015 | Johnson |
| 2015/0065206 A1 | 3/2015 | Rojas |
| 2015/0068935 A1 | 3/2015 | Kay et al. |
| 2015/0133203 A1 | 5/2015 | Xie et al. |
| 2015/0137734 A1 | 5/2015 | Wojcik et al. |
| 2015/0141090 A1 | 5/2015 | Hwan et al. |
| 2015/0141091 A1 | 5/2015 | Oh et al. |
| 2015/0189963 A1 | 7/2015 | Lai et al. |
| 2015/0195938 A1 | 7/2015 | Witter et al. |
| 2015/0365120 A1 | 12/2015 | Wojcik et al. |
| 2016/0056856 A1 | 2/2016 | Diebel |
| 2016/0084614 A1 | 3/2016 | Ellingson |
| 2016/0094263 A1 | 3/2016 | Fathollahi |
| 2016/0119013 A1 | 4/2016 | Wojcik et al. |
| 2016/0198824 A1 | 7/2016 | Rayner |
| 2016/0361852 A1 | 12/2016 | Fathollahi |
| 2020/0313713 A1 | 10/2020 | Fathollahi |

FOREIGN PATENT DOCUMENTS

| | | |
|---|---|---|
| CN | 201639626 U | 11/2010 |
| CN | 201700109 U | 1/2011 |
| CN | 201853616 U | 6/2011 |
| CN | 102123863 A | 7/2011 |
| CN | 202455520 U | 9/2012 |
| EP | 2081201 | 7/2009 |
| EP | 2640042 A1 | 9/2013 |
| EP | 3092878 A1 | 11/2016 |
| EP | 3373107 | 9/2018 |
| JP | 8046371 A | 2/1996 |
| JP | 9023072 A | 1/1997 |
| JP | 3044740 U | 1/1998 |
| JP | 10079582 A | 3/1998 |
| JP | 11231970 A | 8/1999 |
| JP | 11231973 A | 8/1999 |
| JP | 11284358 A | 10/1999 |
| JP | 2000125916 A | 5/2000 |
| JP | 2003324796 A | 11/2003 |
| JP | 2004247297 A | 9/2004 |
| JP | 2006064998 A | 3/2006 |
| WO | 2012002899 A1 | 1/2012 |
| WO | 2012051358 A2 | 4/2012 |
| WO | 2015105894 A1 | 7/2015 |

OTHER PUBLICATIONS

Anonymous: "[Review] the Newest Waterproof Case On the Market: Introducing the Escape Capsule . . . | i PhoneLife.com" i Phone + i Pad Life Magazine Nov. 6, 2012 (Nov. 6, 2012) XP055292666 Retrieved from the Internet: URP: http://www.iphonelife.com/blog/28861/review-newest-waterproof-case-market-introducing-escape-capsile [retrieved on Aug. 2, 2016].

"Catalyst Impact Protection For iPhone X—Review." YouTube, uploaded by Michael Billig, Nov. 8, 2017. Web. Accessed Nov. 23, 2020, https://www.youtube.com/watch?v=TA-yFKB_qAA.

Walters, Jon. "Catalyst Impact Case For iPhone X Review a Refinement in Performance and Style!" MacSources, Nov. 28, 2017. Web. Accessed Nov. 23, 2020, https://macsources.com/catalyst-impact-case-for-iphone-x-review.

Catalyst. "Catalyst Waterproof iPad Case for iPad Pro 12.9" 2018 Waterproof 6.6 ft—Full Body Protection, Heavy Duty Drop Proof 4ft, Kickstand, True Acoustic Sound Technology, Built-in Screen Protector. Amazon.com, Inc., Date First Available Jul. 15, 2019. Web. https://www.amazon.com/dp/B07Q2Y91Y1.

Amazon.com "iPad Air Case, SUPCASE Heavy Duty Beetle Defense Series Full-Body Rugged Hybrid Protective Case Cover with Built-in Screen Protector for Apple iPad Air (Black/Black, not fit iPad Air 2)." Amazon.com, Inc., Date First Available Nov. 1, 2013. Web. https://www.amazon.com/dp/B00GDHAT3W.

* cited by examiner

SWITCH ASSEMBLY FOR ENGAGING A SWITCH OF AN ELECTRONIC DEVICE

CROSS-REFERENCE TO RELATED APPLICATIONS

The present application is a continuation of U.S. patent application Ser. No. 16/557,364, filed Aug. 30, 2019, the entirety of which is herein incorporated by reference.

TECHNICAL FIELD

The present specification generally relates to protective cases that cover electronic devices and, more specifically, cases that have a switch assembly for engaging a switch of an electronic device.

BACKGROUND

As background, electronic devices (e.g., smartphones, tablets, or the like) generally include switches to control various functionality of the device. For example, a switch may include a muting switch that turns off the volume of the mobile device, particularly to silence a ringtone. In order to provide additional protection against falls or fluid contact, protective cases may be arranged around the device while still allowing functional access to the screen and/or buttons of the device. Certain protective cases may include an opening around a switch to allow for direct user access to the sliding switch. However, direct access may inadvertently provide an entry point for fluid into the mobile device, which may lead to water damage. Other protective cases may include a protective switch that covers and engages with the switch of the mobile device such that the protective switch is actuable by a user to move in the same manner as the switch and move the switch. However, direct manipulation of such protective sliding switches may be difficult for some users.

SUMMARY

In one aspect, a switch assembly for engaging a switch of an electronic device includes a rotatable knob having an axis of rotation, a pin mechanism engaged with the rotatable knob, and a slider body. The pin mechanism includes a pin, the pin being offset from the axis of rotation of the rotatable knob. The slider body is shaped to include a slot in which the pin of the pin mechanism is positioned and a switch recess. The switch recess is shaped to receive and selectively contact the switch of the electronic device when the electronic device is positioned proximate the slider body. Rotation of the rotatable knob in a first direction causes the pin to travel in the slot in a first direction and move the slider body toward contact with a first portion of the switch to urge the switch into a first position, and rotation of the rotatable knob in a second direction causes the pin to travel in the slot in a second direction and move the slider body toward contact with a second portion of the switch to urge the switch into a second position.

In another aspect, a protective case for an electronic device includes a frame shaped to receive the electronic device therein and a switch assembly coupled to the frame for engaging a switch of the electronic device. The switch assembly includes a rotatable knob having an axis of rotation, a pin mechanism engaged with the rotatable knob, and a slider body. The pin mechanism includes a pin, the pin being offset from the axis of rotation of the rotatable knob. The slider body is shaped to include a slot in which the pin of the pin mechanism is positioned and a switch recess. The switch recess is shaped to receive and selectively contact the switch of the electronic device when the electronic device is positioned proximate the slider body. Rotation of the rotatable knob in a first direction causes the pin to travel in the slot in a first direction and move the slider body toward contact with a first portion of the switch to urge the switch into a first position, and rotation of the rotatable knob in a second direction causes the pin to travel in the slot in a second direction and move the slider body toward contact with a second portion of the switch to urge the switch into a second position.

In yet another aspect, a protective case for an electronic device includes a frame having a front portion and a back portion coupled together to define a cavity shaped to receive and encapsulate the electronic device having a switch, and a switch assembly positioned on one of the front portion or the back portion of the frame for engaging the switch of the electronic device when the electronic device is positioned in the cavity defined by the front portion and the back portion. The switch assembly includes a rotatable knob having an axis of rotation, a pin mechanism engaged with the rotatable knob, and a slider body. The pin mechanism includes a pin, the pin being offset from the axis of rotation of the rotatable knob. The slider body is shaped to include a slot in which the pin of the pin mechanism is positioned and a switch recess. The switch recess is shaped to receive and selectively contact the switch of the electronic device when the electronic device is positioned proximate the slider body. Rotation of the rotatable knob in a first direction causes the pin to travel in the slot in a first direction and move the slider body toward contact with a first portion of the switch to urge the switch into a first position, and rotation of the rotatable knob in a second direction causes the pin to travel in the slot in a second direction and move the slider body toward contact with a second portion of the switch to urge the switch into a second position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The figures generally depict a protective case with an integrated switch assembly for engaging a switch of an electronic device. Switch assemblies according to the present disclosure may include a rotatable knob having an axis of rotation, a pin mechanism, and a slider body. The pin mechanism is engaged with the rotatable knob and includes a pin that is offset from an axis of rotation of the rotatable knob. The slider body may be shaped to include a slot in which the pin of the pin mechanism may be positioned. The slider body may further be shaped to include a switch recess that is shaped to receive and selectively contact the switch of the electronic device when the electronic device is positioned proximate the slider body. Rotation of the rotatable knob in a first direction may cause the pin to travel in the slot in a first direction and move the slider body toward contact with a first portion of the switch to urge the switch into a first position (e.g., an active or enabled position). Rotation of the rotatable knob in a second direction may cause the pin to travel in the slot in a second direction and move the slider body toward contact with a second portion of the switch to urge the switch into a second position (e.g., a deactivated or disabled position). Such switch assembly allows for a switch of an electronic device to be completely enclosed, to prevent ingress of fluid and/or debris, without limiting operation of the switch. Additionally, the present devices provides an easier and more comfortable way to engage the switch of the electronic device. Various embodiments of the switch assembly and protective case will be described in more detail herein.

An electronic device may include any electronic device such as a pager, PDA, cellphone, smart phone, tablet, laptop, or the like. Electronic devices according to the present disclosure may include a switch (e.g., a sliding switch, such as a muting switch). It is noted that a switch may be a switch that slides or toggles from a first position to a second position. As will be described herein, an electronic device may be positioned within the protective case. The protective case may provide a protective, and/or waterproof housing around the mobile the device.

Figure 1A:
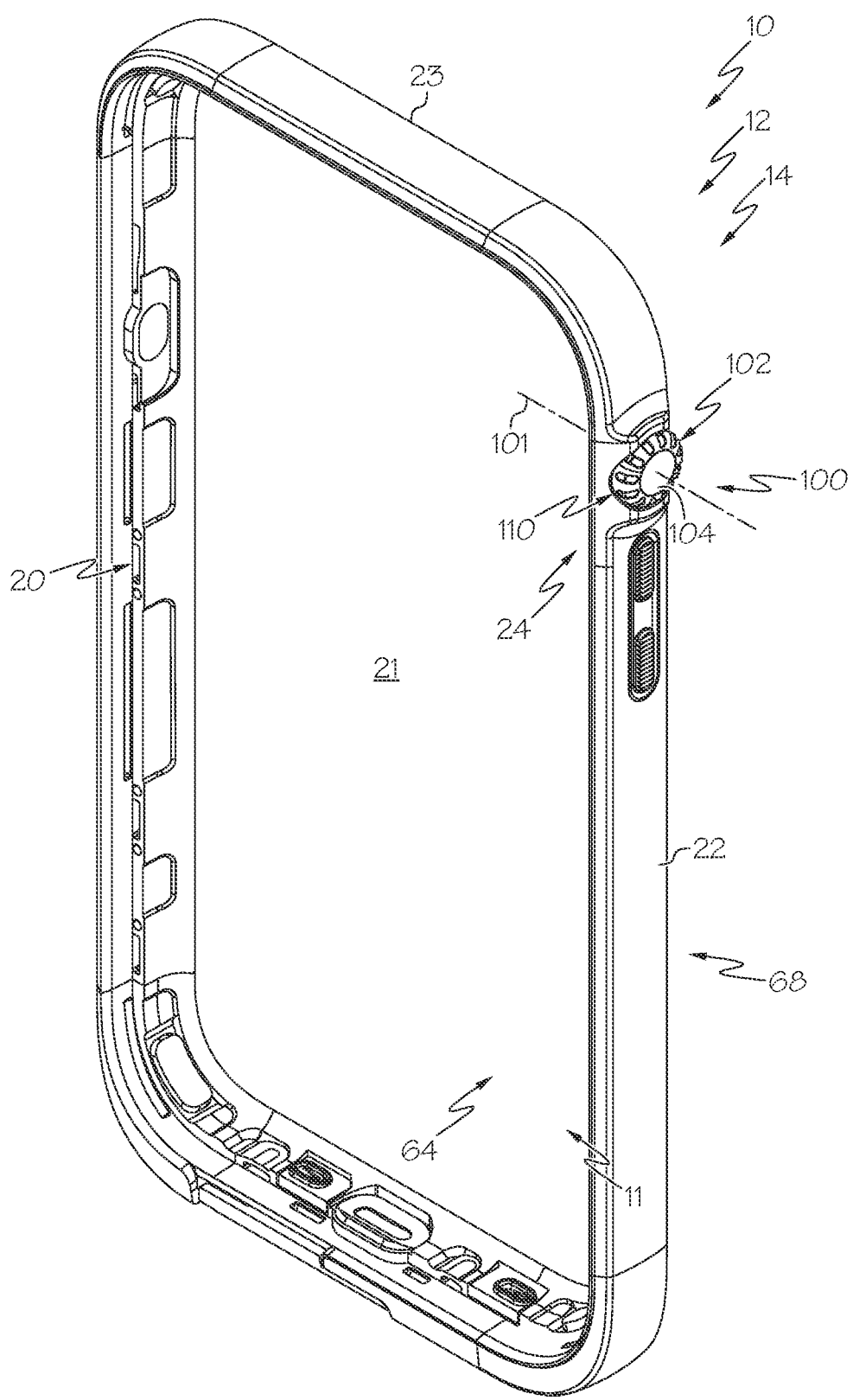
FIG. 1A depicts a front portion of a protective case, according to one or more embodiments shown and described herein.
Figure 1B:
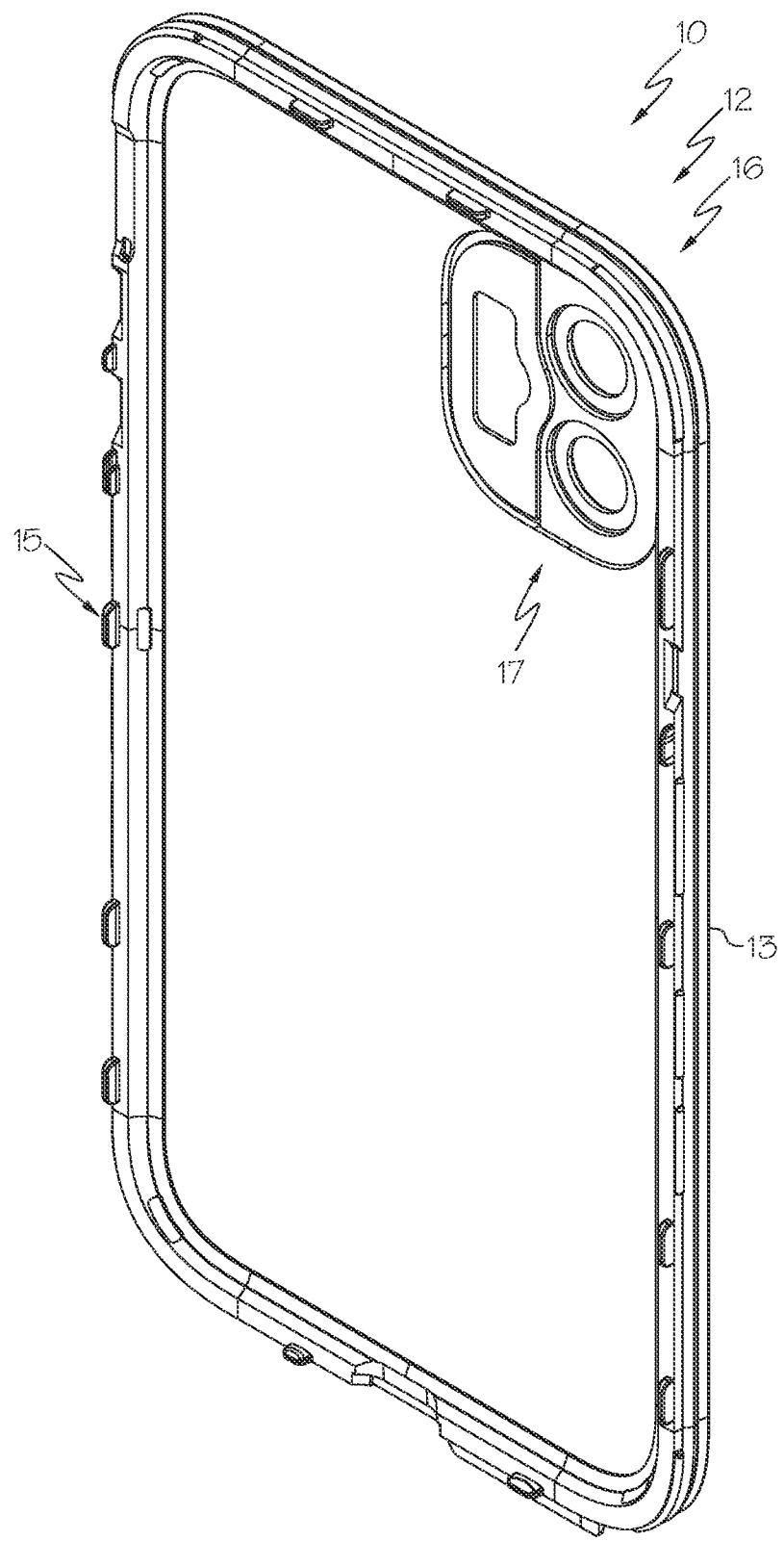
FIG. 1B depicts a back portion of the protective case, according to one or more embodiments shown and described herein.

Referring now to FIGS. 1A and 1B, an embodiment of a protective case 10 is generally depicted. The protective case 10 generally includes a frame 12. The frame 12 defines a cavity 11 within which an electronic device may be disposed. The frame 12 may be separable into one or more components to allow for insertion of the electronic device into the cavity 11 defined by the frame 12. For example, the frame 12 may include a front portion 14, illustrated in FIG. 1A and a back portion 16, illustrated in FIG. 1B. It is noted that each of the front portion 14 and the back portion 16 may be single integral articles or may be assemblies of sub-frame components.

The front portion 14 and the back portion 16 may be separably coupled to one another. That is, the front portion 14 may be assembled to and disassembled from the back portion 16 repeatedly (e.g., to allow for insertion and removal of the electronic device). When the front portion 14 is assembled to the back portion 16 around an electronic device, a fluid tight seal (e.g., a watertight seal and/or an airtight seal) may be formed between the front portion 14 and the back portion 16 to prevent ingress or egress of liquid, dirt, or other debris, into the protective case 10, thereby protecting the electronic device from contact with liquid, dirt, or debris. That is, the protective case 10, when assembled, may provide a waterproof housing for the electronic device positioned therein.

The back portion 16 of the frame 12 may have a body 13 that is arranged to correspond to one or more features of a backside of an electronic device when the electronic device is received within the cavity 11 of the protective case 10. For example, the back portion 16 of the frame 12 may include one or more camera windows 17 or apertures that are aligned with one or more components of a camera device (e.g., a lens and/or flash) to allow for the capture of images by the electronic device when the electronic device is positioned within the protective case 10. In addition, the back portion 16 of the frame 12 may be shaped and sized to generally correspond to the shape and size of a particular electronic device such that the electronic device, when received in the protective case 10 fits within the cavity 11 defined by the frame 12.

The back portion 16 may include one or more projections 15 extending from the body 13 of the back portion 16. The one or more projections 15 are receivable by one or more receiving apertures 20 in the front portion 14 to couple the front portion 14 to the back portion 16, the one or more receiving apertures 20 corresponding in shape and size to the one or more projections 15 such that the one or more receiving apertures 20 retain the one or more projections 15 when the back portion 16 is joined with the front portion 14, as described herein. For example, the back portion 16 may include a plurality of projections disposed around a perimeter of the back portion 16 of the case. In other embodiments, the one or more projections 15 may be part of the front portion 14 of the frame 12 and the one or more receiving apertures 20 may be formed in the back portion 16 of the frame 12.

The front portion 14 of the frame 12 may be have a body 23 arranged to correspond to one or more features of a front side of an electronic device when the electronic device is received within the cavity 11 of the protective case 10. For example, the front portion 14 of the frame 12 may include a screen aperture 21 that is aligned within one or more portions of a touch screen or other user input hardware of the electronic device to allow for interaction of a user with the touch screen or other user input hardware. In some embodiments, the screen aperture 21 may include a protective screen made of plastic, glass, or any other suitable material. In addition, the front portion 14 of the frame 12 may be shaped and sized to generally correspond to the shape and size of a particular electronic device such that the electronic device, when received in the protective case 10 fits within the cavity 11 defined by the frame 12.

The front portion 14, the back portion 16, or a combination thereof may define a sidewall 22 of the frame 12. The sidewall 22 may be arranged to correspond to a perimeter of the electronic device when the electronic device is positioned within the frame 12. The sidewall 22 may define an interior side 64 and an exterior side 68, wherein the electronic device is position on an interior side 64 of the sidewall 22 when positioned within the frame 12. Formed within the sidewall 22 may be an assembly port 24 (further illustrated in FIGS. 2A-4B) to which a switch assembly 100 may be assembled.

Figure 4A:
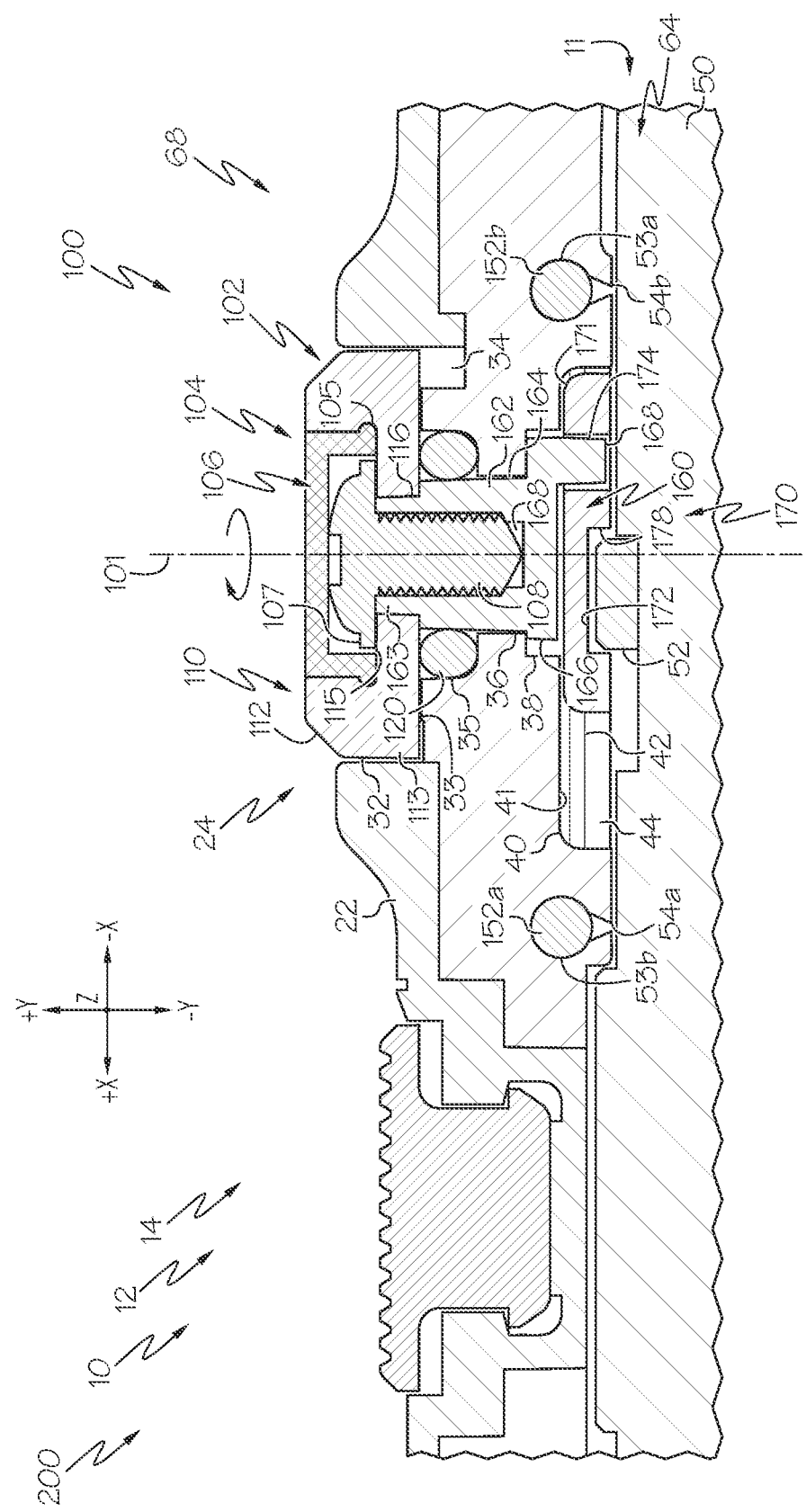
FIG. 4A depicts a cross-sectional view of the switch assembly engaged with a sliding switch of a mobile device in a first position, according to one or more embodiments shown and described herein.
Figure 4B:
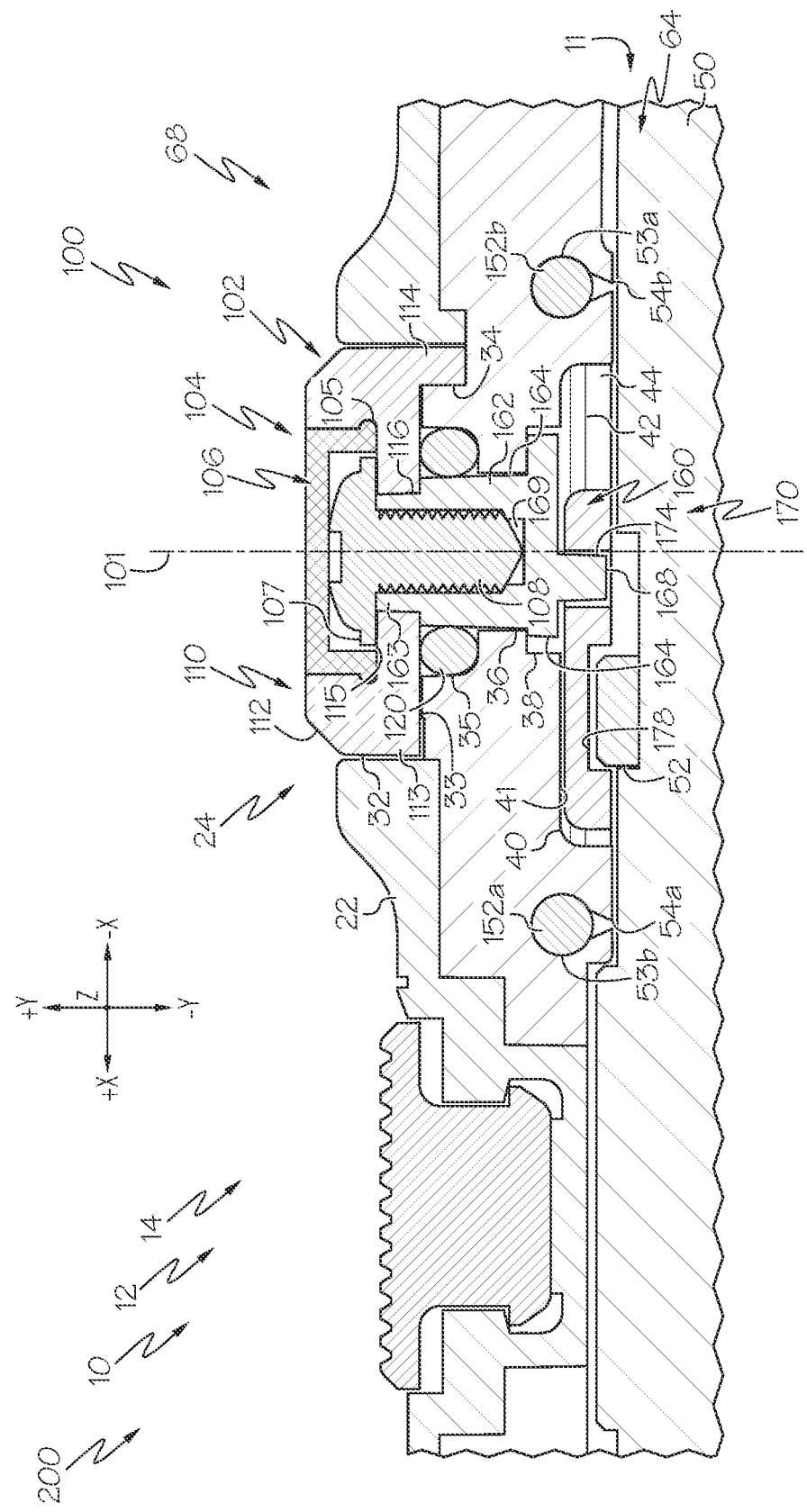
FIG. 4B depicts the switch assembly moving the sliding switch of the mobile device to a second position, according to one or more embodiments shown and described herein.

That is, coupled to the frame 12 at an assembly port 24 is a switch assembly 100 for engaging a switch 52 of an electronic device 50, as illustrated in FIGS. 4A and 4B. The switch assembly 100 encloses around the switch 52 of the electronic device 50, and when actuated, allows the switch assembly 100 to selectively contact the switch 52 to engage and disengage a function of the switch 52 by moving the switch 52 from an active position to an inactive position and vice versa.

Figure 2A:
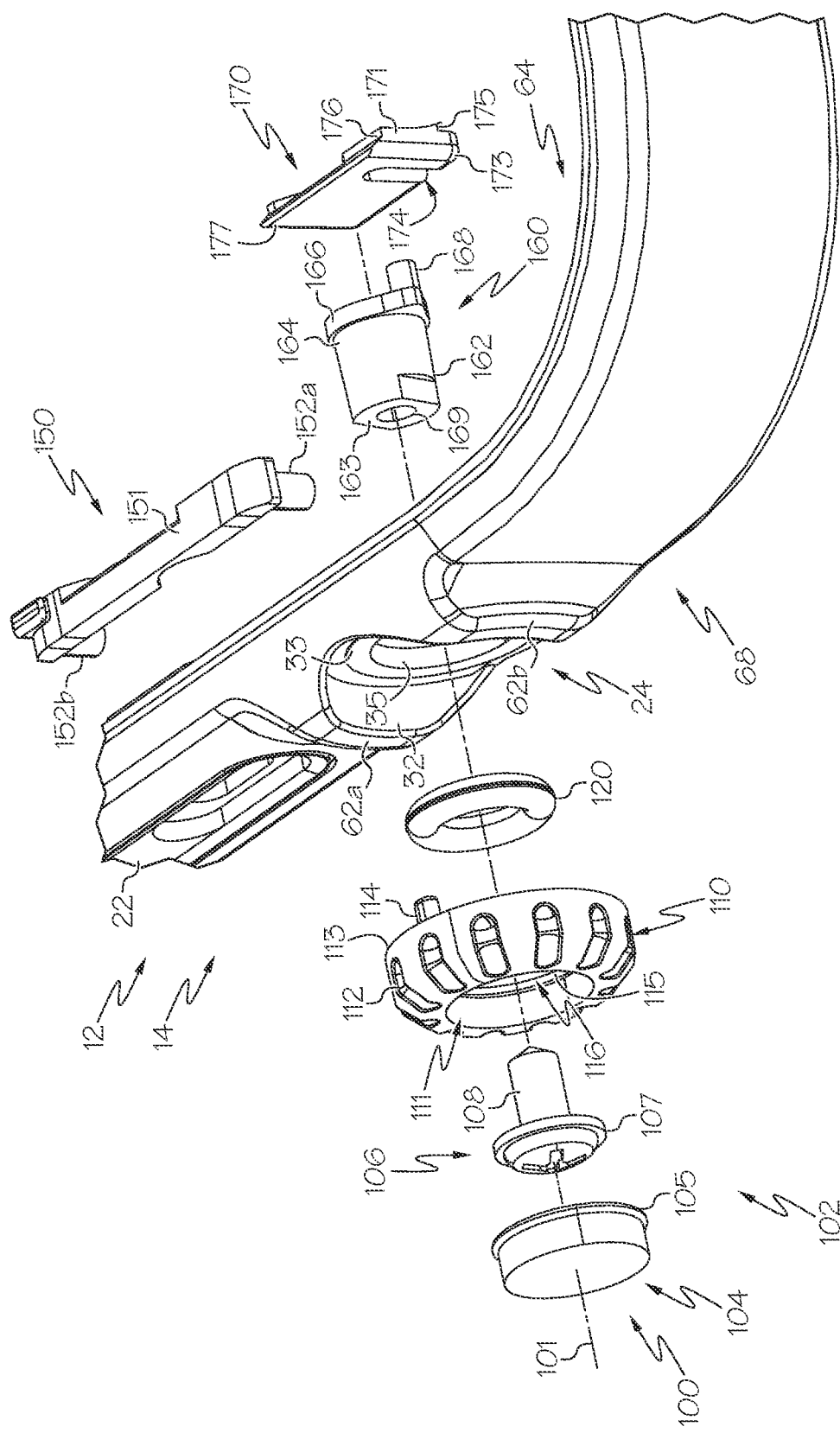
FIG. 2A depicts an exploded view of a switch assembly for engaging a sliding switch of a mobile device, according to one or more embodiments shown and described herein.
Figure 2B:
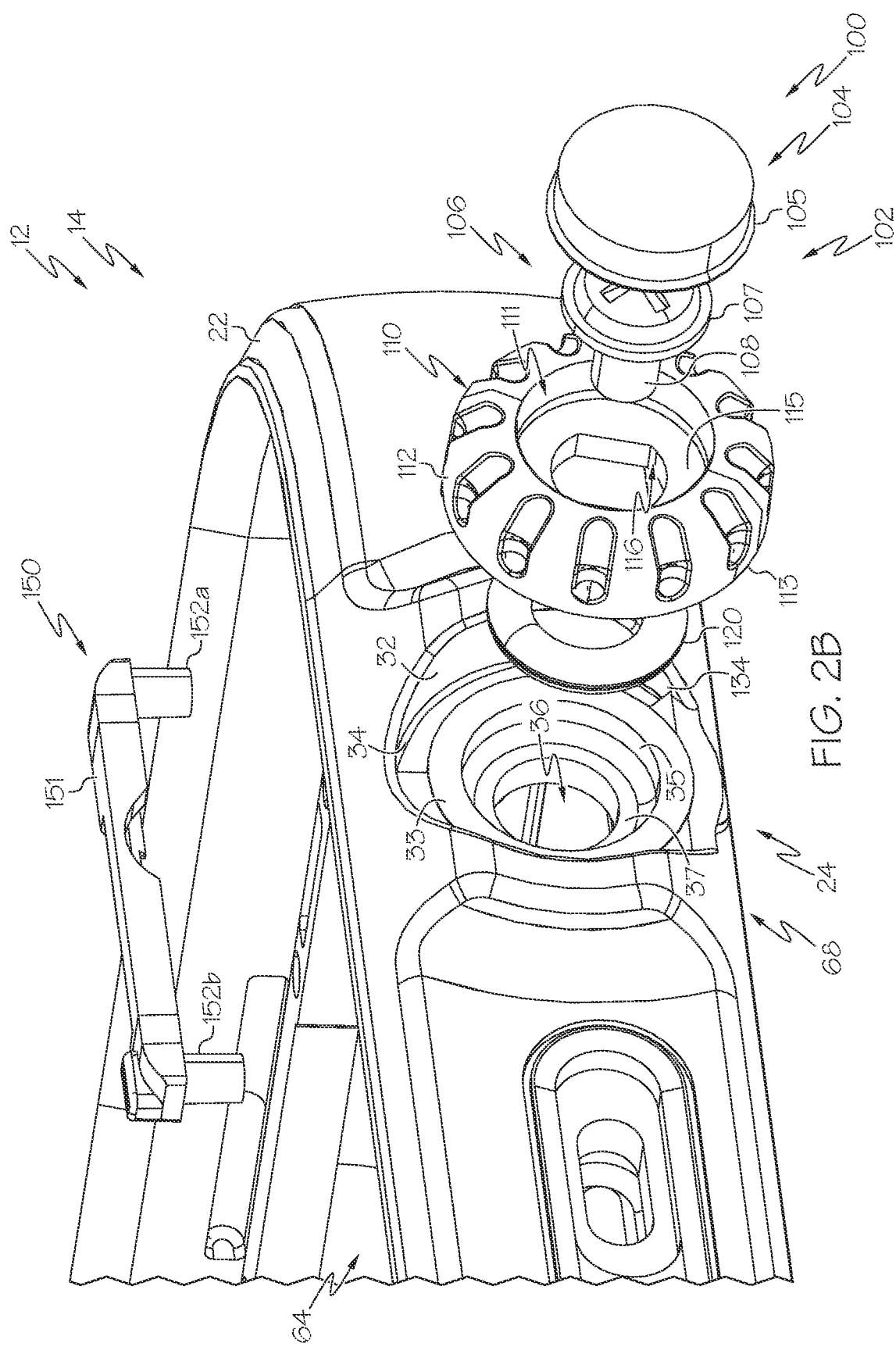
FIG. 2B depicts another exploded view of the switch assembly of FIG. 2A, according to one or more embodiments shown and described herein.
Figure 2C:
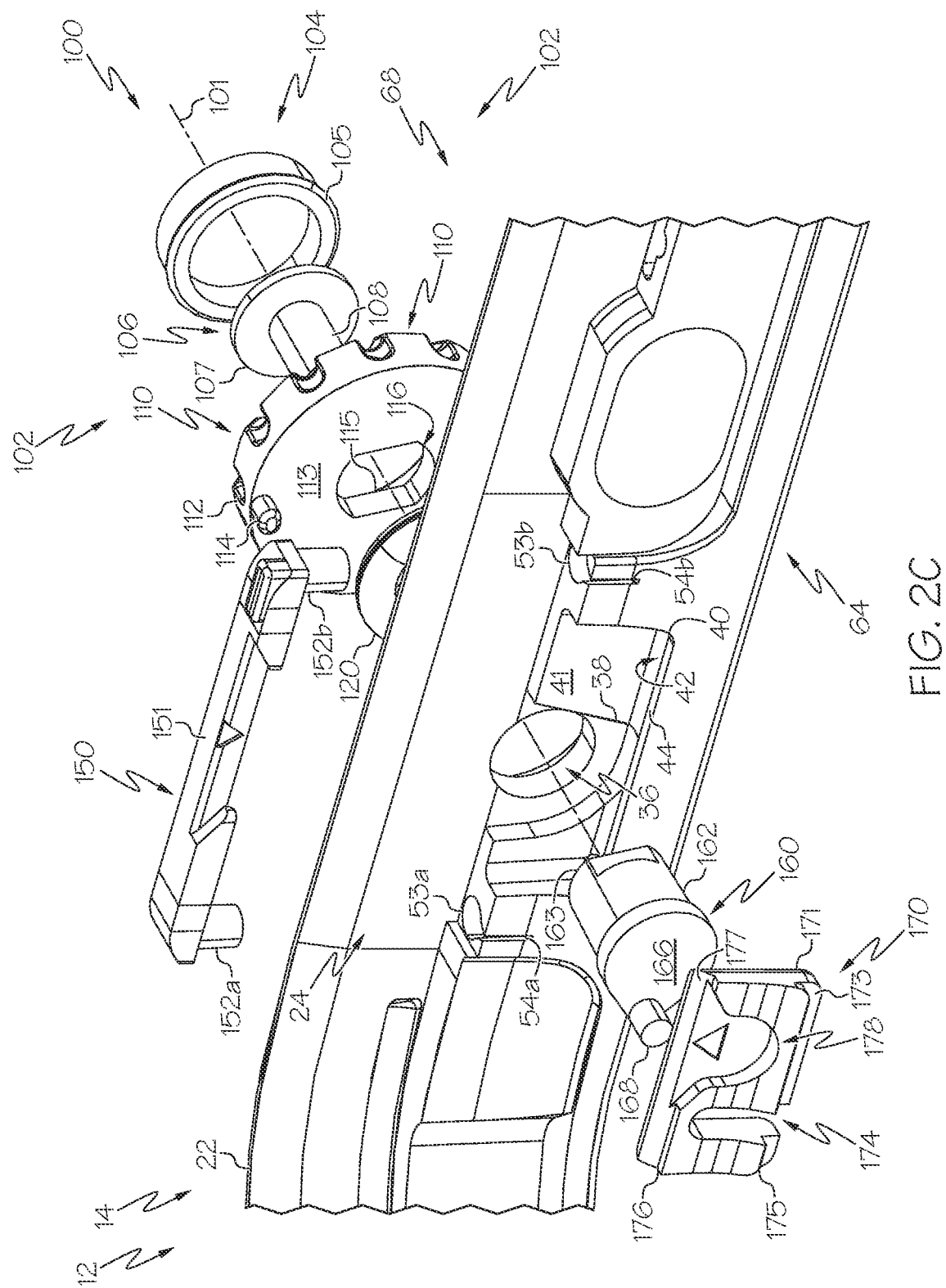
FIG. 2C depicts another exploded view of the switch assembly of FIG. 2A, according to one or more embodiments shown and described herein.

FIGS. 2A-2C illustrate various exploded views of the switch assembly 100 from the sidewall 22 of the frame 12. The various portions of the assembly port 24 will be further described in relation to the various components of the switch assembly 100 mounted to the assembly port 24. In particular, the switch assembly 100 generally includes a rotatable knob 102, a pin mechanism 160, and a slider body 170 mounted to the frame 12 via the assembly port 24. The assembly port 24 may define one or more recesses for receiving and supporting motion of various components of the switch assembly 100. These and additional features will be described in greater detail below.

The rotatable knob 102 may include a knob ring 110, a limit pin 114, a coupler 106, and a coupler cover 104. The rotatable knob 102 has an axis of rotation 101 around which one or more components of the rotatable knob 102 rotates. It is noted that the rotatable knob 102 may include a greater or fewer number of components without departing from the scope of the present disclosure.

The knob ring 110 may be any rotatable or twistable device, which may be rotated or twisted around the axis of rotation 101 of the rotatable knob 102. For example, the knob ring 110 is illustrated as being approximately circular and defining a coupler-receiving aperture 111. It is noted that while the knob ring 110 is shown as being circular, other shapes are also contemplated and possible (e.g., oval, egg-shaped, square, rectangular, etc.). The knob ring 110 may define a user engagement surface 112. In some embodiments, the user engagement surface 112 of the knob ring 110 may be textured in order to improve a user's ability to grip and twist the knob ring 110. Coupled to an interior facing surface 113 of the knob ring 110, opposite the user engagement surface 112, and offset from the axis of rotation 101, may be the limit pin 114. That is, the limit pin 114 extends from the interior facing surface 113 of the knob ring 110 at a location that is not a center of the knob ring 110, as depicted, for example, in FIG. 2C.

For mounting of the knob ring 110 to the frame 12, the assembly port 24 of the frame 12 may include a knob mounting recess 32, in which the rotatable knob 102 may be inserted. For example, the knob mounting recess 32 may define a main chamber sized and shaped to receive the knob ring 110 and allow rotation of the knob ring 110 within the knob mounting recess 32. Stated another way, the knob recess 32 is a recess formed in to the sidewall 22 of the frame 12. The knob recess 32 may be defined by separated raised walls 62a, 62b that extend from the sidewall 112 formed about the assembly port 24 and contiguous to the assembly port 24. The knob mounting recess 32 may be limited by a backstop wall 33, which may act to limit an insertion distance of knob ring 110 therethrough. The backstop wall 33 may be recessed into the sidewall 22, such that when assembled the knob ring 110 sits at least partially recessed into the sidewall 22.

Positioned adjacent to the backstop wall 33 may be a rotational limit slot 34 in which the limit pin 114 may be positioned (see also FIGS. 4A and 4B). The rotational limit slot 34 may define an arc of less than 360° (e.g., less than or equal to 180°, less than or equal to 90°, or the like) around the axis of rotation 101. Accordingly, as the knob ring 110 is rotated about the axis of rotation 101 of the rotatable knob 102, the limit pin 114 traverses the rotational limit slot 34. Once the limit pin 114 reaches an end of the rotational limit slot 34, the knob ring 110 is prevented from further rotation in that direction by the limit pin 114. The knob ring 110 may be rotated in an opposite direction until the limit pin 114 reaches a second end of the rotational limit slot 34. Stated another way, engagement of the limit pin 114 with the rotational limit slot 34 limits the angular rotation of the rotatable knob 102 about the axis of rotation 101 of the rotatable knob 102.

As noted above, the knob ring 110 may define a coupler-receiving aperture 111 that extends from the user engagement surface 112 to a stop wall 115. That is, the stop wall 115 may be inset into the knob ring 110. The coupler 106 may be any device configured to couple the knob ring 110 to the pin mechanism 160, as will be described in greater detail herein. For example, the coupler 106 may be a threaded fastener having a head 107 and a threaded shank 108. When assembled to the knob ring 110, the stop wall 115 of the coupler-receiving aperture 111 may be configured to engage with the head 107 of the coupler 106 to limit the insertion of the coupler 106 through the coupler-receiving aperture 111. The stop wall 115 may be of such a depth that the head 107 of the coupler 106 is completely positioned within the coupler-receiving aperture 111.

Referring to FIGS. 4A and 4B, which illustrate a cross-section of the protective case 10 along and parallel to the axis of rotation 101 of the switch assembly 100, formed within the stop wall 115 of the coupler-receiving aperture 111 may be a pass-through opening 116 to allow for the shank 108 of the coupler 106 to extend therethrough. The pass-through opening 116 may have a width larger than a width of the shank 108 to allow for both passage of the shank 108 and, insertion of a portion of a stem 162 of the pin mechanism 160. In particular, the pass-through opening 116 may be shaped to interlock with a stem 162 of the pin mechanism 160 such that rotation of the rotatable knob 102 causes rotation of the pin mechanism 160.

The coupler cover 104 may be any device for covering the head 107 of the coupler 106. For example, the coupler cover 104 may be a cap that may be pressed over the head 107 of the coupler 106 to cover or otherwise camouflage the head 107 of the coupler 106. The coupler cover 104 may include a locking flange 105 that interlocks with the knob ring 110, such as illustrated in FIGS. 4A and 4B. In particular, FIGS. 4A and 4B illustrate the locking flange 105 positioned within a locking recess 103 of the knob ring 110 adjacent to the stop wall 115. Stated another way, the locking flange 105 is sized and shaped to correspond to the locking recess 103. When in position within the locking recess 103, the locking flange 105 may be in contact with the stop wall 115.

Referring again to FIGS. 2A and 2B, the sidewall 22 may further define a sealant recess 35 for receiving an O-ring 120 or other sealant material. For example, inset further inward from the knob mounting recess 32 may be the sealant recess 35. The sealant recess 35 may have a width less than that of the knob recess 32. The sealant recess 35 may be sized and shaped for insertion of the O-ring 120 or other sealant material that may aid in preventing ingress of fluid into the protective case 10 through sidewall 22 or switch assembly 100. The sealant recess 35 may be of a depth such that the O-ring 120 or other sealant material is compressed between the knob ring 110 and a base 37 of the sealant recess 35. When assembled, the O-ring 120 or other sealant material may be positioned between and in contact with the knob ring 110 and the sidewall 22 (e.g., within the sealant recess 35) of the frame 12. The shank 108 of the coupler 106 may extend through a center of the O-ring 120 or other sealant material.

The sidewall 22 may define a through-passage 36 for one or more portions of the switch assembly 100 to extend. For example, the through-passage 36 may extend from the sealant recess 35 through the sidewall 22 to the interior side 68 of the sidewall 22. As illustrated in FIGS. 4A and 4B, when assembled the shank 108 of the coupler 106 may extend at least partially through the through-passage 36 to couple the knob ring 110 to the pin mechanism 160.

Referring now to FIG. 2C, the pin mechanism 160 may be any device engagable with the rotatable knob 102 and comprising a pin 168, which is offset from the axis of rotation 101 of the rotatable knob 102. For example, the pin 168 is spaced from the axis of rotation 101 and extends outwardly in a direction parallel to the axis of rotation 101. The pin mechanism 160 may include a stem 162 comprising a first end 163 and a second end 164, wherein the first end 163 of the stem 162 is engagable with the pass-through opening 116 of the knob ring 110. In embodiments, the first end 163 of the stem 162 may have a different cross-sectional shape than the second end 164 of the stem 162. For example, the first end 163 of the stem 162 may be shaped to substantially match a shape of the pass-through opening 116 of the knob ring 110, such that the first end 163 of the stem 162 may be nested within the pass-through opening 116 of the knob ring 110. The shape of the first end 163 of the stem 162 and the pass-through opening 116 may prevent rotation of the pin mechanism 160 relative to the knob ring 110. For example, the first end 163 of the stem 162 may be one or more straight wall sections that correspond to one or more straight wall sections of the pass-through opening 116 and prevent rotation of the first end 163 of the stem 162 within the pass-through opening 116. Such non-rotatable engagement may fix the pin mechanism 160 relative to the rotatable knob 102 such that rotation of the rotatable knob 102 rotates the pin mechanism 160.

In some embodiments, the first end 163 of the stem 162 and the second end 164 of the stem 162 may not have different cross-sectional shapes. For example, a non-rotatable engagement may be instead provided through friction (such as provided in a press-fit engagement) that prevents rotation of the pin mechanism 160 relative to the rotatable knob 102. In yet further embodiment, the action of tightening the coupler 106 may provide enough force to prevent rotation of the pin mechanism 160 relative to the rotatable knob 102.

A plate 166 may be coupled to the second end 164 of the stem 162 and the pin 168 may be coupled to and extend from the plate 166. The plate 166 of the pin mechanism 160 may extend past a width of the stem 162 to position the pin 168 further from the axis of rotation 101 of the rotatable knob 102. In other embodiments, the pin 168 may directly extend from the second end 164 of the stem 162.

Still referring to FIG. 2C, an interior side 62 of the sidewall 22 is depicted. Formed in the interior side of the sidewall 22, the assembly port 24 may further include one or more mounting recesses for mounting the pin mechanism 160 and slider body 170, described in greater detail below. The through-passage 36 may be sized to a dimension large enough to receive the stem 162 of the pin mechanism 160 therethrough and support rotational motion of the stem 162 about the axis of rotation 101. The through-passage 36 may open to a plate-receiving groove 38, which opens further into a slider groove 40. Stated another way, the plate-receiving groove 38 may be formed or otherwise inset into a back wall 41 of the slider groove 40.

Referring to FIGS. 4A and 4B, the stem 162 of the pin mechanism 160 may be advanced through the through-passage 36, through a center of the O-ring 120 or other sealant material, until the plate 166 of the pin mechanism 160 is positioned and contacted with the plate-receiving groove 38 to abut the through-passage 36. The O-ring 120 or other sealant material may form a fluid and/or airtight seal around the stem 162 of the pin mechanism 160. The first end 163 of the stem 162 may then be inserted into the pass-through opening 116 of the knob ring 110. The shank 108 of the coupler 106 may be engaged with an opening 169 (e.g., a threaded passage) formed within and extending into the first end 163 of the stem 162. The coupler 106 can be advanced into the opening 169 of the stem 162 until the head 107 of the coupler 106 engages the stop wall 115 of the knob ring 110. The coupler cover 104 may then be snapped into place over the head 107 of the coupler 106 to conceal the coupler 106. When assembled, the pin 168 of the pin mechanism 160 extends from the plate 166 into a volume of the slider groove 40 and into slot 174 of slider body 170.

Figure 3:
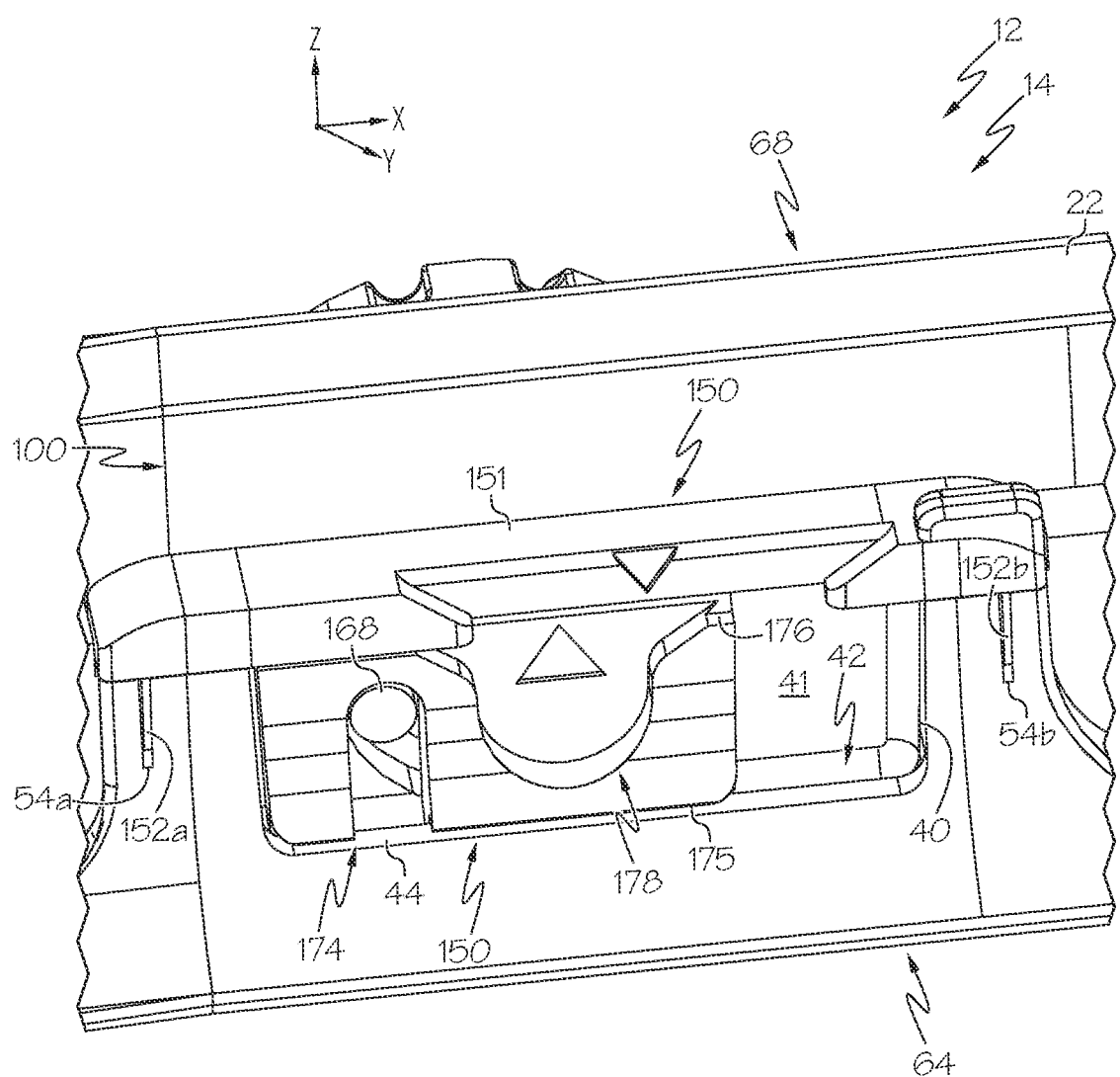
FIG. 3 depicts an assembled interior view of the switch assembly of FIGS. 2A-2C, according to one or more embodiments shown and described herein.

The slider body 170 may be slidably disposed in the slider groove 40 and configured to slide along the slide path (e.g., along the X-direction of the coordinate axes depicted in FIGS. 3, 4A, and 4B) defined by the slider groove 40. The slider body 170 may be shaped to include the slot 174 in which the pin 168 of the pin mechanism 160 is positioned when the switch assembly 100 is assembled. The slot 174 may define a travel path (e.g., along a Z-direction of the coordinate axes depicted in FIGS. 3, 4A, and 4B) through which the pin 168 can travel. As illustrated, the travel path as defined by the slot 174 may be perpendicular to the axis of rotation 101 (e.g., extending along the Y-direction of the coordinate axes depicted in FIGS. 3, 4A, and 4B) of the rotatable knob 102. Furthermore, the travel path as defined by the slot 174 may be perpendicular to a slide path of the slider body 170 defined by the slider groove 40. For example, and as illustrated in FIGS. 4A and 4B, as the rotatable knob 102 is rotated about the axis of rotation 101, the pin 168 traverses the slot 174, which pushes the slider body 170 to slide along the slider groove 40 in a direction perpendicular to the axis of rotation 101 along the rotatable knob 102.

The slider body 170 may further also be shaped to include a switch recess 178 shaped to receive and selective contact a switch 52 of the electronic device 50 (illustrated in FIGS. 4A and 4B). For example, the switch recess 178 may engage the switch 52 such that movement of the slider body 170 causes the switch 52 to move between a first position, shown in FIG. 4A, and a second position (e.g., a silencing position and a sound-on position where the switch 52 is a silencing switch 52), shown in FIG. 4B. For example, the slider body 170 may be moved into contact with a first portion 54 of the switch 52 to urge the switch 52 into a first position (e.g., as shown in FIG. 4A). The slider body 170 may be moved into contact with a second portion 56 of the switch 52 to urge the switch 52 into a second position (e.g., as shown in FIG. 4B).

To retain the slider body 170 within the slider groove 40, the slider body 170 may have one or more locking flanges. For example, the slider body 170 may include a first locking flange 173 coupled to and extending along a first edge 175 of the slider body 170. The first locking flange 173 may have a reduced thickness relative to a thickness of the first edge 175 of the slider body 170. The first locking flange 173 may be integral with the slider body 170 or a separate component therefrom. The first locking flange 173 may be continuous along the first edge 175 or may be discontinuous along the first edge 175. For example and as illustrated, the first locking flange 173 may not be continuous across a base of the slot 174.

The slider groove 40 may have a channel 42 formed at the base of the slider groove 40. When assembled, the first locking flange 173 may be inserted into the channel 42 and slidable along the channel 42. The first edge 175 of the slider body 170 may positioned over and in contact with a base surface 44 of the slider groove 40.

The slider body 170 may include a second locking flange 177 along a second edge 176 of the slider body 170 opposite the first edge 175. The second locking flange 177 may have a reduced thickness relative to a thickness of the second edge 176 of the slider body 170. The second locking flange 177 may be integral with the slider body 170 or a separate component therefrom. The second locking flange 177 may be continuous along the second edge 176 or may be discontinuous along the second edge 176. In some embodiments, the switch recess 178 may have an inset depth greater than a thickness of the second locking flange 177.

A locking mechanism 150 may be provided to engage the second locking flange 177 so as to lock the slider body 170 into the slider groove 40. That is, the locking mechanism 150 may be arranged about the slider body 170 to restrict motion of the slider body 170 in a direction transverse to the slide path as defined by the slider groove 40. To facilitate locking of the slider body 170 within the slider groove 40, the locking mechanism 150 may comprise an elongate body 151. Referring to FIG. 3, when assembled, the elongate body 151 may extend over the second locking flange 177 to prevent the slider body 170 from becoming dislodged from the slider groove 40. The elongate body 151 may have a reduced thickness over the switch recess 178, to allow for insertion of the switch 52 passed the elongate body 151 and into the switch recess 178.

At either end of the elongate body 151, may be locking prongs 152a, 152b, configured to mate with mating apertures 53a, 53b formed within the frame 12, illustrated in FIG. 2C. Stated another way, a first locking prong 152a may extend from a first end of the elongate body 151 and a second locking prong 152b may extend from a second end of the elongate body 151. The first mating aperture 53a may extend into the frame 12 on one side of the assembly port 24 and the second mating aperture 53b may be extend into the frame 12 on a second side of the assembly port 24. The locking prongs 152a, 152b may be pressed into the mating apertures 53a, 53b to mount the locking mechanism 150 to the frame 12. The locking prongs 152a, 152b may engage the mating apertures 53a, 53b in a press fit to ensure a secure engagement between the locking prongs 152a, 152b and the mating apertures 53a, 53b. In some embodiments, the mating apertures 53a, 53b may include pressure release slits 54a, 54b, to allow for escape of air when mating the locking prongs 152a, 152b with the mating apertures 53a, 53b.

Referring now to FIGS. 4A and 4B, operation of the switch assembly 100 will now be described. FIG. 4A illustrates an electronic device 50 positioned within the protective case 10 to provide an electronic device assembly 200. That is, the protective case 10 provides a protective covering to the electronic device 50. Referring to FIGS. 1A and 1B, the front portion 14 couples to the back portion 16 of the frame 12 to encapsulate the electronic device 50 within the protective case 10 within cavity 11. The switch 52 of the electronic device 50 is positioned in a first position (e.g., an active position) and at least partially positioned within the switch recess 178 of the slider body 170. Accordingly, when the slider body 170 moves, the slider body 170 is selectively contacted with the first or second portions 54, 56 of the switch 52. The contact between the slider body 170 and the switch 52 causes the switch 52 to move from the first position to the second position shown in FIG. 4B.

To cause the slider body 170 to move the switch 52 from the first position to the second position, a user may contact the contact surface 112 of the knob ring 110, and twist the knob ring 110 about the axis of rotation 101 in a first direction (e.g., a clockwise direction). Such twisting causes the pin mechanism 160 to travel the pin 168 within the slot 174 of the slider body 170 in a first direction and move the slider body 170 toward contact with the first portion 54 of the switch 52 to urge the switch 52 to a first position. That is, movement of the pin 168 imparts a force to the slider body 170 surrounding the slot 174, causing the slider body 170 to move along the slide path and the pin 168 to move along the slot 174. As the slider body 170 moves, the force is transferred to the switch 52, which causes the switch 52 to move with the slider body 170 to the second position shown in FIG. 4B.

To move the switch 52 back to the original position shown in FIG. 4A, a user may engage the contact surface 112 of the knob ring 110 and twist the knob ring 110 about the axis of rotation 101 in a second direction (e.g., a counterclockwise direction). The opposite twisting direction causes the pin mechanism 160 to traverse the pin 168 along the slot 174 in opposite second, opposite direction to move the slider body 170 toward contact with the second portion 26 of the switch 52 to urge the switch 52 to a second position. That is, the pin 168 applies a force to the slider body 170 to move the slider body 170 and the switch 52 back to the second position depicted in FIG. 4A.

Embodiments can be described with reference to the following numbered clauses, with preferred features laid out in the dependent clauses.

1. A switch assembly for engaging a switch of an electronic device, the switch assembly comprising: a rotatable knob having an axis of rotation; a pin mechanism engaged with the rotatable knob and comprising a pin, the pin being offset from the axis of rotation of the rotatable knob; and a slider body, the slider body being shaped to include a slot in which the pin of the pin mechanism is positioned and a switch recess, the switch recess being shaped to receive and selectively contact the switch of the electronic device when the electronic device is positioned proximate the slider body, rotation of the rotatable knob in a first direction causing the pin to travel in the slot in a first direction and move the slider body toward contact with a first portion of the switch to urge the switch into a first position, and rotation of the rotatable knob in a second direction causing the pin to travel in the slot in a second direction and move the slider body toward contact with a second portion of the switch to urge the switch into a second position.

2. The switch assembly of clause 1, wherein the rotatable knob comprises: a knob ring, and a limit pin coupled the knob ring, wherein the limit pin limits an angular rotation of the rotatable knob.

3. The switch assembly of clause 1 or 2, wherein the slot defines a travel path perpendicular to the axis of rotation of the rotatable knob.

4. The switch assembly of any preceding clause, wherein the pin mechanism comprises: a stem comprising a first end and a second end; and a plate coupled to the second end of the stem, wherein the pin is coupled to the plate and extends therefrom and into the slot of the slider body.

5. The switch assembly of clause 4, wherein: the rotatable knob comprises a pass-through opening; and the first end of the stem is positioned within the pass-through opening of the rotatable knob such that the stem is non-rotatable relative to the rotatable knob.

6. A protective case for an electronic device, the protective case comprising: a frame shaped to receive the electronic device therein; and a switch assembly coupled to the frame for engaging a switch of the electronic device, the switch assembly comprising: a rotatable knob having an axis of rotation; a pin mechanism engaged with the rotatable knob and comprising a pin, the pin being offset from the axis of rotation of the rotatable knob; and a slider body, the slider body being shaped to include a slot in which the pin of the pin mechanism is positioned and a switch recess, the switch recess being shaped to receive and selectively contact the switch of the electronic device when the electronic device is positioned proximate the slider body, rotation of the rotatable knob in a first direction causing the pin to travel in the slot in a first direction and move the slider body toward contact with a first portion of the switch to urge the switch into a first position, and rotation of the rotatable knob in a second direction causing the pin to travel in the slot in a second direction and move the slider body toward contact with a second portion of the switch to urge the switch into a second position.

7. The protective case of clause 6, wherein: the rotatable knob comprises: a knob ring, and a limit pin coupled the knob ring; and the frame defines a rotational limit slot formed therein, wherein the limit pin is positioned within the rotational limit slot and movement of the pin through the rotational limit slot limits an angular rotation of the rotatable knob.

8. The protective case of clause 6 or 7, wherein the frame defines a slider groove defining a slide path and the slider body is slidably disposed within the slider groove.

9. The protective case of clause 8, further comprising a locking mechanism positioned to restrict motion of the slider body in a direction transverse to the slide path.

10. The protective case of clause 9, wherein the locking mechanism comprises: an elongate body spanning across a portion of the slider body; a first locking prong coupled to a first end of the elongate body and inserted into the frame proximate to a first side of the slider groove; and a second locking prong coupled to a second end of the elongate body and inserted into the frame proximate to a second side of the slider groove.

11. The protective case of any of clauses 6-10, wherein the pin mechanism comprises: a stem comprising a first end and a second end; and a plate coupled to the second end of the stem, wherein the pin is coupled to the plate and extends therefrom and into the slot of the slider body.

12. The protective case of clause 11, wherein the frame further defines a plate-receiving groove formed within a back wall of the slider groove, wherein the plate is engaged with the plate-receiving groove and the stem extends through the frame from a first side of the frame to a second side of the frame, and wherein the first end of the stem is positioned within a pass-through opening of the rotatable knob such that the stem is non-rotatable relative to the rotatable knob.

13. A protective case for an electronic device, the protective case comprising: a frame comprising a front portion and a back portion coupled together to define a cavity shaped to receive and encapsulate the electronic device having a switch; a switch assembly positioned on one of the front portion or the back portion of the frame for engaging the switch of the electronic device when the electronic device is positioned in the cavity defined by the front portion and the back portion, the switch assembly comprising: a rotatable knob having an axis of rotation; a pin mechanism engaged with the rotatable knob and comprising a pin, the pin being offset from the axis of rotation of the rotatable knob; and a slider body, the slider body being shaped to include a slot in which the pin of the pin mechanism is positioned and a switch recess, the switch recess being shaped to receive and selectively contact the switch of the electronic device when the electronic device is positioned proximate the slider body, rotation of the rotatable knob in a first direction causing the pin to travel in the slot in a first direction and move the slider body toward contact with a first portion of the switch to urge the switch into a first position, and rotation of the rotatable knob in a second direction causing the pin to travel in the slot in a second direction and move the slider body toward contact with a second portion of the switch to urge the switch into a second position.

14. The protective case of clause 13, wherein: the rotatable knob comprises: a knob ring, and a limit pin coupled the knob ring; and the front portion of the frame defines a rotational limit slot formed therein, wherein the limit pin is positioned within the rotational limit slot and movement of the pin through the rotational limit slot limits an angular rotation of the rotatable knob.

15. The protective case of clause 13 or 14, wherein the front portion of the frame defines a slider groove defining a slide path and the slider body is slidably disposed within the slider groove.

16. The protective case of any of clauses 13-15, further comprising a locking mechanism positioned to restrict motion of the slider body in a direction transverse to a slide path of the slider body.

17. The protective case of clause 16, wherein the locking mechanism comprises: an elongate body spanning across a portion of the slider body; a first locking prong coupled to a first end of the elongate body and inserted into the frame proximate to a first side of a slider groove in which the slider body is slidably disposed; and a second locking prong coupled to a second end of the elongate body and inserted into the frame proximate to a second side of the slider groove.

18. The protective case of clause 16, wherein the locking mechanism comprises an elongate body and a first locking prong at a first end of the elongate body and a second locking prong at a second end of the elongate body.

19. The protective case of any of clauses 13-19, wherein the pin mechanism comprises: a stem comprising a first end and a second end; and a plate coupled to the second end of the stem, wherein the pin is coupled to the plate and extends therefrom and into the slot of the slider body.

20. The protective case of clause 19, wherein the front portion of the frame wherein the frame further defines a plate-receiving groove formed within a back wall of the slider groove, wherein the plate is engaged with the plate-receiving groove and the stem extends through the frame from a first side of the frame to a second side of the frame, and wherein the first end of the stem is positioned within a pass-through opening of the rotatable knob such that the stem is non-rotatable relative to the rotatable knob.

It should now be understood that embodiments as provided wherein are directed to switch assemblies that include a rotatable knob having an axis of rotation, a pin mechanism, and a slider body. The pin mechanism is engaged with the rotatable knob and includes a pin that is offset from an axis of rotation of the rotatable knob. The slider body may be shaped to include a slot in which the pin of the pin mechanism may be positioned. The slider body may further be shaped to include a switch recess that is shaped to receive and selectively contact the switch of the electronic device when the electronic device is positioned proximate the slider body. Rotation of the rotatable knob in a first direction may cause the pin to travel in the slot in a first direction and move the slider body toward contact with a first portion of the switch to urge the switch into a first position (e.g., an active or enabled position). Rotation of the rotatable knob in a second direction may cause the pin to travel in the slot in a second direction and move the slider body toward contact with a second portion of the switch to urge the switch into a second position (e.g., a deactivated or disabled position). Such switch assembly allows for a switch of an electronic device to be completely enclosed, to prevent ingress of fluid and/or debris, without limiting operation of the switch. Additionally, the present devices provides an easier and more comfortable way to engage the switch of the electronic device.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A removable protective cover for an electronic device having a switch, the protective cover comprising:
   a frame shaped to receive the electronic device therein, the frame defining a knob mounting recess; and
   a switch assembly coupled to the frame for engaging the switch of the electronic device, the switch assembly comprising:
      a rotatable knob recessed within the knob mounting recess and operatively coupled to a pin such that rotation of the rotatable knob rotates the pin; and
      a slider body comprising a switch recess sized to receive the switch of the electronic device therein, wherein rotation of the rotatable knob causes the pin to slide the slider body across the frame to move the switch from a first position to a second position.

2. The protective cover of claim 1, wherein the rotatable knob comprises:
   a knob ring, and
   a limit pin coupled to the knob ring, wherein the limit pin limits an angular rotation of the rotatable knob via interaction with the frame.

3. The protective cover of claim 2, further comprising a pin mechanism comprising the pin and operatively coupled to the rotatable knob via a fastener.

4. The protective cover of claim 1, wherein the slider body defines a slot defining a travel path for the pin perpendicular to an axis of rotation of the rotatable knob.

5. The protective cover of claim 4, further comprising a pin mechanism comprising the pin and operatively coupled to the rotatable knob wherein the pin mechanism comprises:
   a stem comprising a first end and a second end; and
   a plate coupled to the second end of the stem, wherein the pin is coupled to the plate and extends therefrom and into the slot of the slider body.

6. The protective cover of claim 5, wherein:
   the rotatable knob comprises a pass-through opening; and
   the first end of the stem is positioned within the pass-through opening of the rotatable knob such that the stem is non-rotatable relative to the rotatable knob.

7. The protective cover of claim 1, wherein:
   the frame defines a slider groove,
   the slider body is slidably positioned within the slider groove.

8. The protective cover of claim 7, further comprising a locking mechanism that locks the slider body into the slider groove.

9. The protective cover of claim 8, wherein the locking mechanism comprises a first locking prong and a second locking prong mated to mating apertures formed within the frame along either side of the slider groove.

10. The protective cover of claim 9, wherein each mating aperture comprises a pressure release slit.

11. An electronic device assembly, comprising:
    an electronic device comprising a switch; and
    a removable protective cover comprising:
       a frame shaped to receive the electronic device therein; and
       a switch assembly coupled to the frame and operable to move the switch of the electronic device from a first position to a second position, the switch assembly comprising:
          a rotatable knob operatively coupled to a pin such that rotation of the rotatable knob rotates the pin; and
          a slider body comprising a switch recess housing the switch of the electronic device therein, wherein rotation of the rotatable knob causes the pin to slide the slider body across the electronic device to move the switch from the first position to the second position.

12. The electronic device assembly of claim 11, wherein the rotatable knob comprises:
    a knob ring, and
    a limit pin coupled to the knob ring, wherein the limit pin limits an angular rotation of the rotatable knob via interaction with the frame.

13. The electronic device assembly of claim 12, further comprising a pin mechanism comprising the pin and operatively coupled to the rotatable knob via a fastener.

14. The electronic device assembly of claim 11, wherein the slider body defines a slot defining a travel path for the pin perpendicular to an axis of rotation of the rotatable knob.

15. The electronic device assembly of claim 14, further comprising a pin mechanism comprising the pin and operatively coupled to the rotatable knob wherein the pin mechanism comprises:

a stem comprising a first end and a second end; and a plate coupled to the second end of the stem, wherein the pin is coupled to the plate and extends therefrom and into the slot of the slider body.

16. The electronic device assembly of claim 15, wherein:

the rotatable knob comprises a pass-through opening; and the first end of the stem is positioned within the pass-through opening of the rotatable knob such that the stem is non-rotatable relative to the rotatable knob.

17. The electronic device assembly of claim 11, wherein:

the frame defines a slider groove, the slider body is slidably positioned within the slider groove.

18. The electronic device assembly of claim 17, further comprising a locking mechanism that locks the slider body into the slider groove.

19. The electronic device assembly of claim 18, wherein the locking mechanism comprises a first locking prong and a second locking prong mated to mating apertures formed within the frame along either side of the slider groove.

20. The electronic device assembly of claim 19, wherein each mating aperture comprises a pressure release slit.

* * * * *